(12) United States Patent
Hamano et al.

(10) Patent No.: US 6,606,194 B2
(45) Date of Patent: Aug. 12, 2003

(54) VARIABLE MAGNIFICATION OPTICAL SYSTEM HAVING IMAGE STABILIZING FUNCTION

(75) Inventors: Hiroyuki Hamano, Yamato (JP); Hiroki Yoshida, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/997,088

(22) Filed: Nov. 30, 2001

(65) Prior Publication Data
US 2002/0063961 A1 May 30, 2002

Related U.S. Application Data

(60) Division of application No. 09/251,415, filed on Feb. 17, 1999, which is a continuation-in-part of application No. 09/037,856, filed on Mar. 10, 1998, now abandoned.

(30) Foreign Application Priority Data

Mar. 18, 1997 (JP) .............................. 9-084428
Mar. 18, 1997 (JP) .............................. 9-084429
Feb. 19, 1998 (JP) ............................. 10-054435

(51) Int. Cl.⁷ .............................................. G02B 27/64
(52) U.S. Cl. ...................... 359/557; 359/554; 359/676; 359/687
(58) Field of Search ................................ 359/554–557, 359/676–677, 683–688; 396/52–55; 348/208

(56) References Cited

U.S. PATENT DOCUMENTS

| | | | |
|---|---|---|---|
| 4,832,471 A | 5/1989 | Hamano | 359/676 |
| 4,859,042 A | 8/1989 | Tanaka | 359/687 |
| 4,934,796 A | 6/1990 | Sugiura et al. | 359/676 |
| 4,988,174 A | 1/1991 | Horiuchi et al. | 359/626 |
| 4,998,809 A | 3/1991 | Tsuji et al. | 359/557 |
| 5,050,972 A | 9/1991 | Mukaiya et al. | 359/683 |
| 5,134,524 A | 7/1992 | Hamano et al. | 359/687 |
| 5,138,492 A | 8/1992 | Hamano et al. | 359/684 |
| 5,249,079 A | 9/1993 | Umeda | 359/554 |
| 5,299,064 A | 3/1994 | Hamano et al. | 359/684 |
| 5,396,367 A | 3/1995 | Ono et al. | 359/687 |
| 5,418,646 A | 5/1995 | Shibata et al. | 359/687 |
| 5,430,576 A | 7/1995 | Hamano | 359/684 |
| 5,521,758 A | 5/1996 | Hamano | 359/557 |
| 5,543,970 A | 8/1996 | Hata et al. | 359/690 |

(List continued on next page.)

FOREIGN PATENT DOCUMENTS

| | | |
|---|---|---|
| JP | 56-21133 | 5/1981 |
| JP | 56-34847 | 8/1981 |
| JP | 57-7414 | 2/1982 |
| JP | 61-223819 | 10/1986 |
| JP | 1-116619 | 5/1989 |
| JP | 2-124521 | 5/1990 |
| JP | 5-60974 | 3/1993 |
| JP | 6-331891 | 12/1994 |
| JP | 7-128619 | 5/1995 |
| JP | 7-199124 | 8/1995 |
| JP | 8-278445 | 10/1996 |

*Primary Examiner*—Thong Nguyen
(74) *Attorney, Agent, or Firm*—Fitzpatrick, Cella, Harper & Scinto

(57) ABSTRACT

A variable magnification optical system having an image stabilizing function includes, in order from an object side to an image side, a fixed first lens unit of positive refractive power, a second lens unit of negative refractive power, a third lens unit of positive refractive power and a fourth lens unit of positive refractive power. The second lens unit and the fourth lens unit are moved to effect variation of magnification. The third lens unit has a negative lens of meniscus form concave toward the image side and an aspheric surface, and the third lens unit is movable in a direction perpendicular to an optical axis to stabilize an image, or a lens sub-unit constituting part of the third lens unit is movable in the direction perpendicular to the optical axis to stabilize an image.

17 Claims, 24 Drawing Sheets

U.S. PATENT DOCUMENTS

| | | | |
|---|---|---|---|
| 5,546,230 A | 8/1996 | Sato et al. | 359/684 |
| 5,579,171 A | 11/1996 | Suzuki et al. | 359/687 |
| 5,583,697 A | 12/1996 | Mukaiya | 359/687 |
| 5,585,966 A | 12/1996 | Suzuki | 359/557 |
| 5,600,490 A | 2/1997 | Sugawara et al. | 359/690 |
| 5,610,766 A | 3/1997 | Aoki et al. | 359/684 |
| 5,638,216 A | 6/1997 | Horiuchi et al. | 359/683 |
| 5,654,826 A | 8/1997 | Suzuki | 359/557 |
| 5,677,792 A | 10/1997 | Hamano | 359/557 |
| 5,751,496 A | 5/1998 | Hamano | 359/677 |
| 5,771,123 A | 6/1998 | Hamano | 359/557 |
| 5,933,283 A * | 8/1999 | Hamano | 359/687 |
| 5,963,378 A | 10/1999 | Tochigi et al. | 359/687 |

* cited by examiner

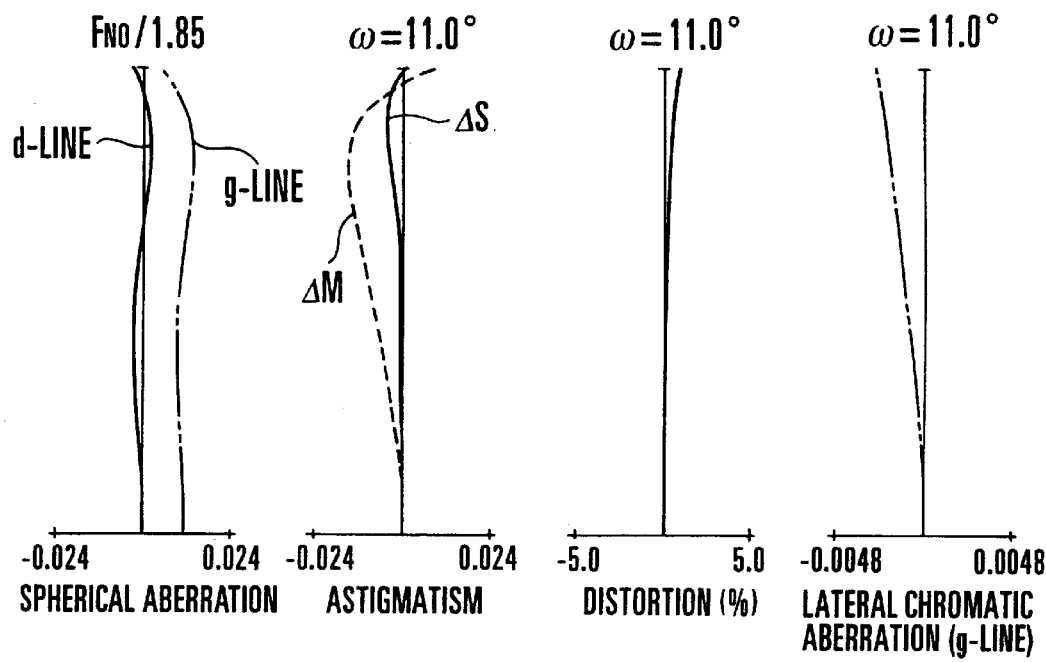
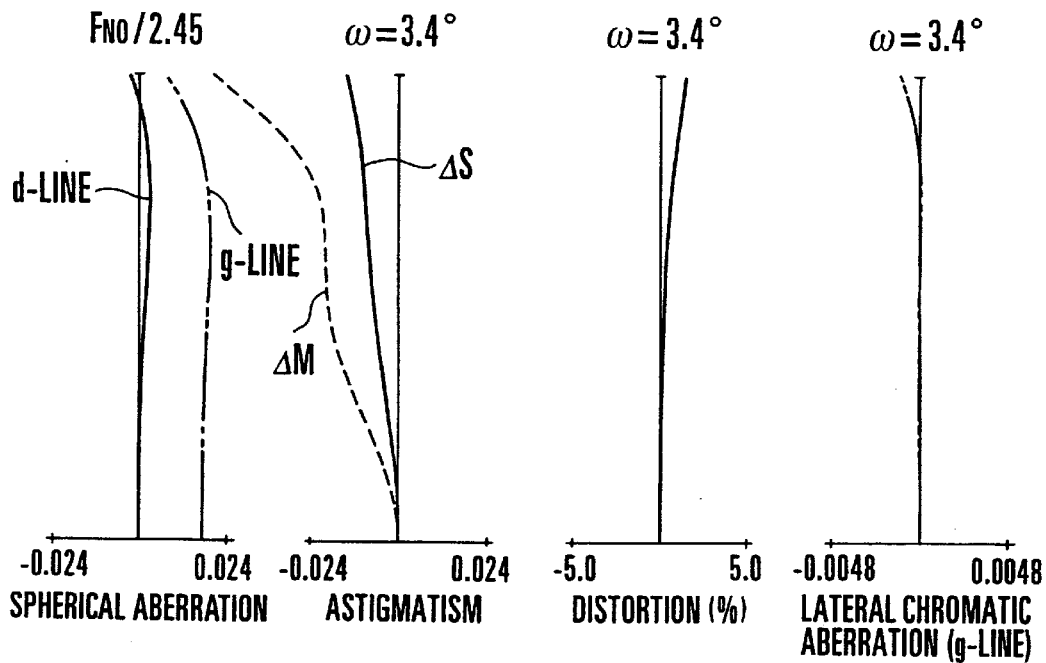

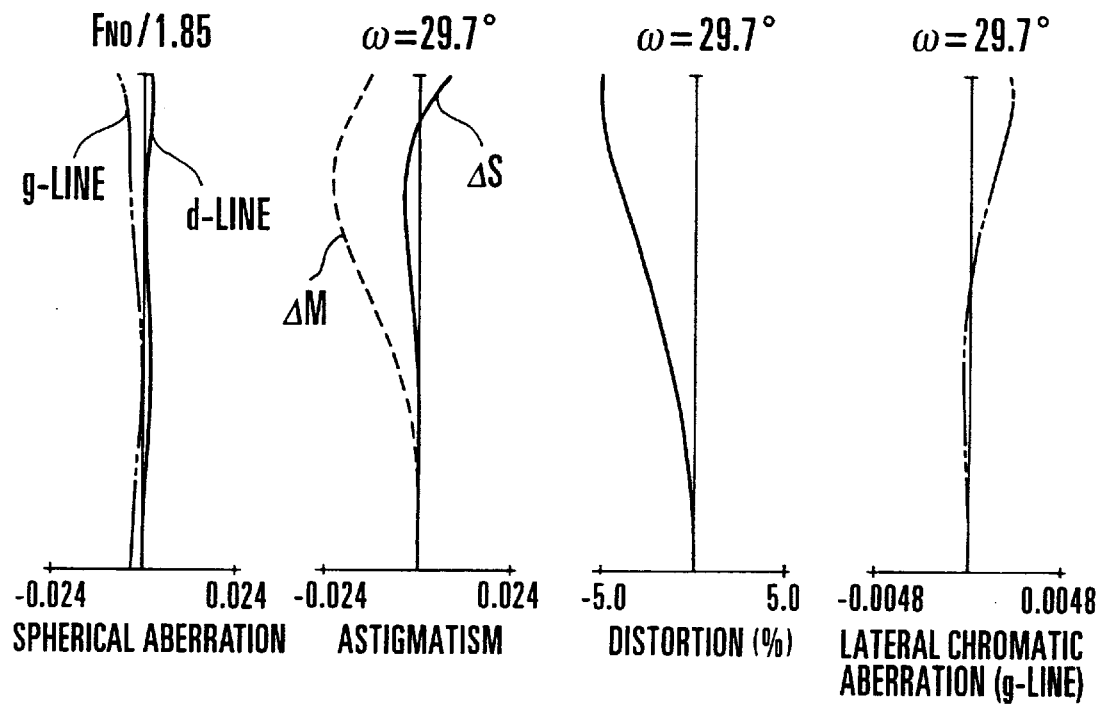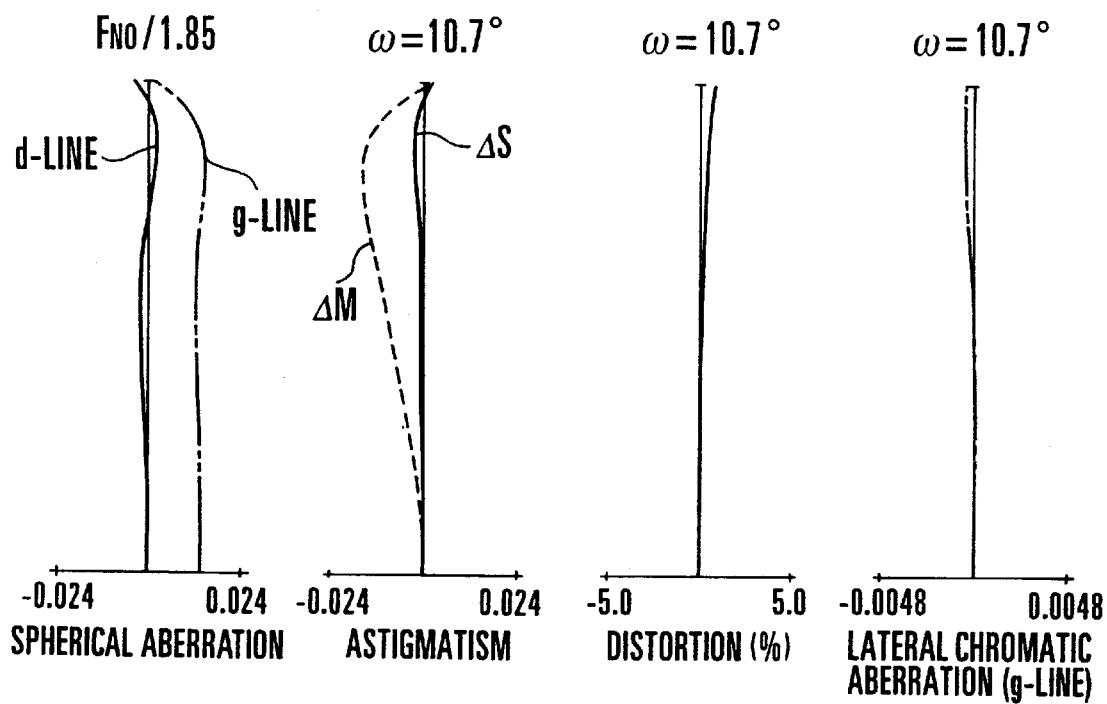

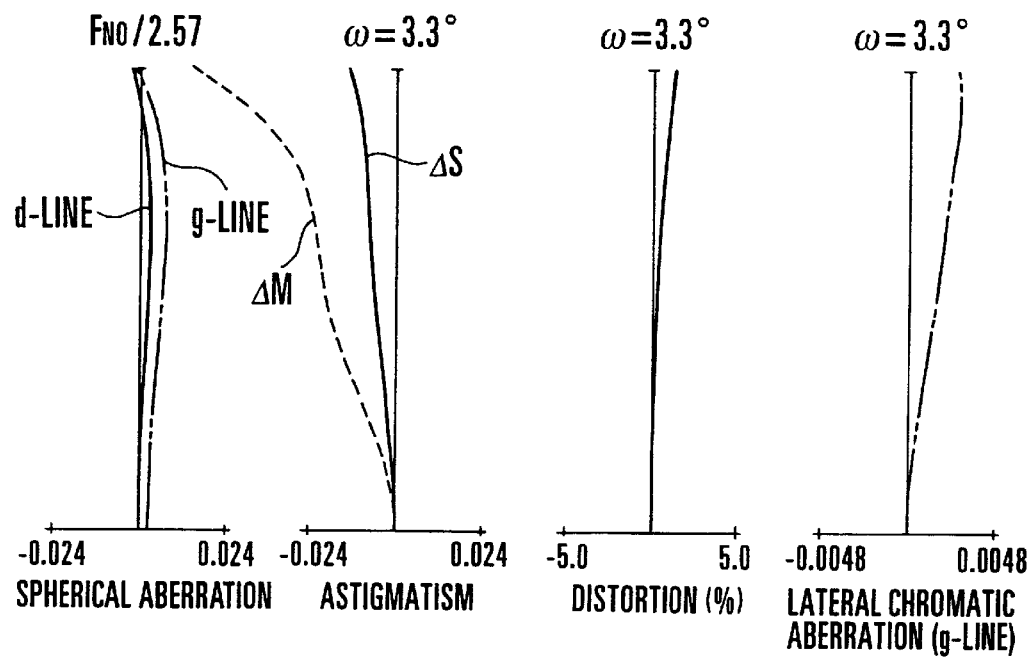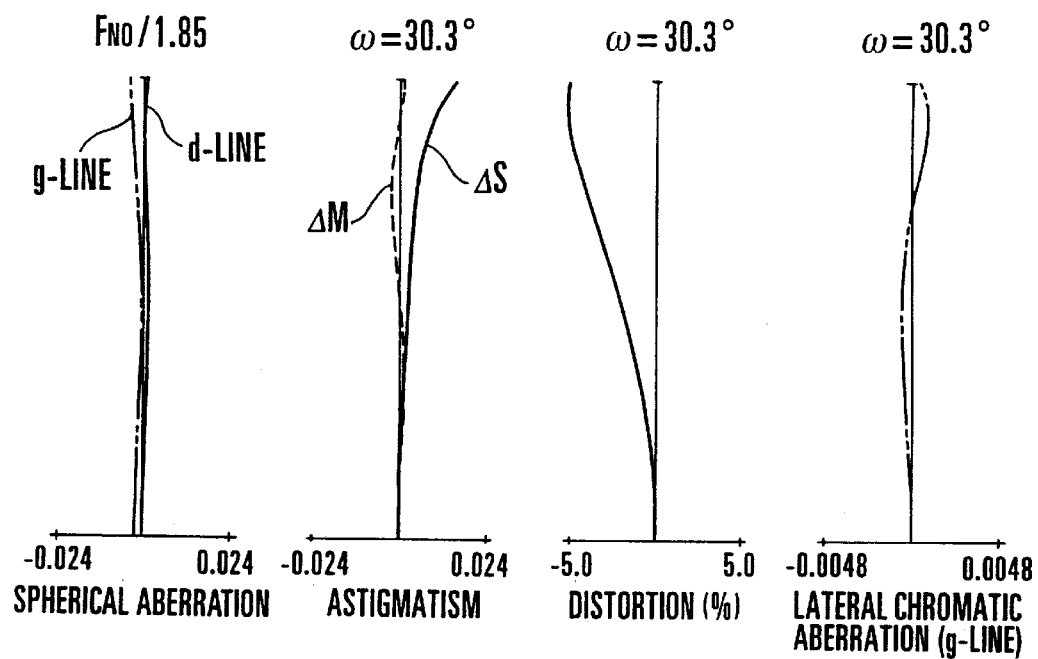

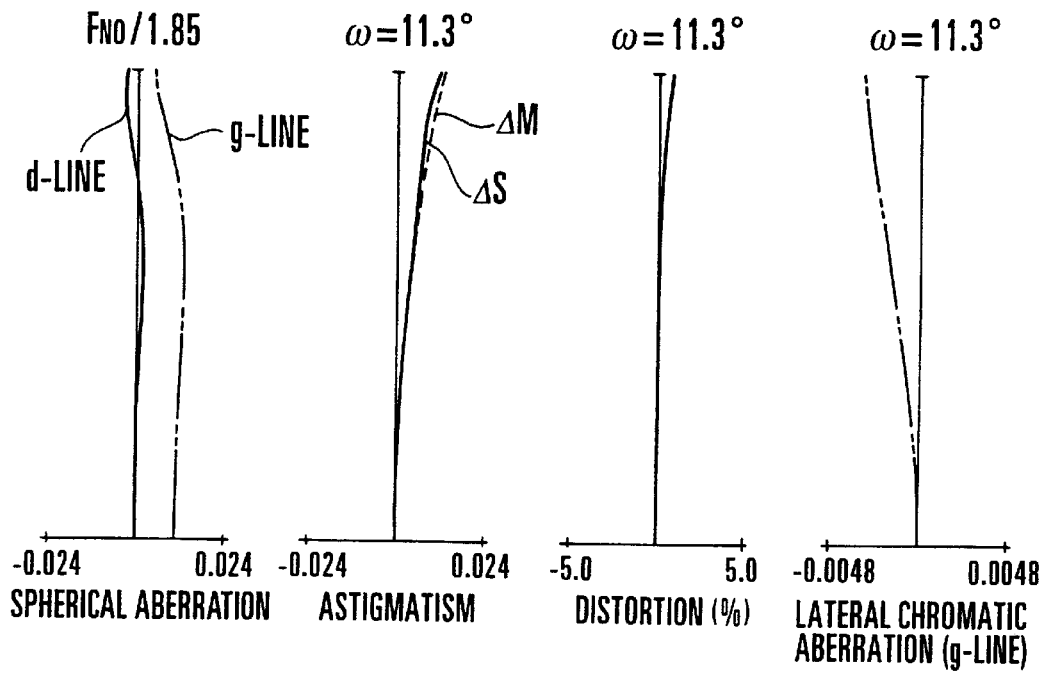
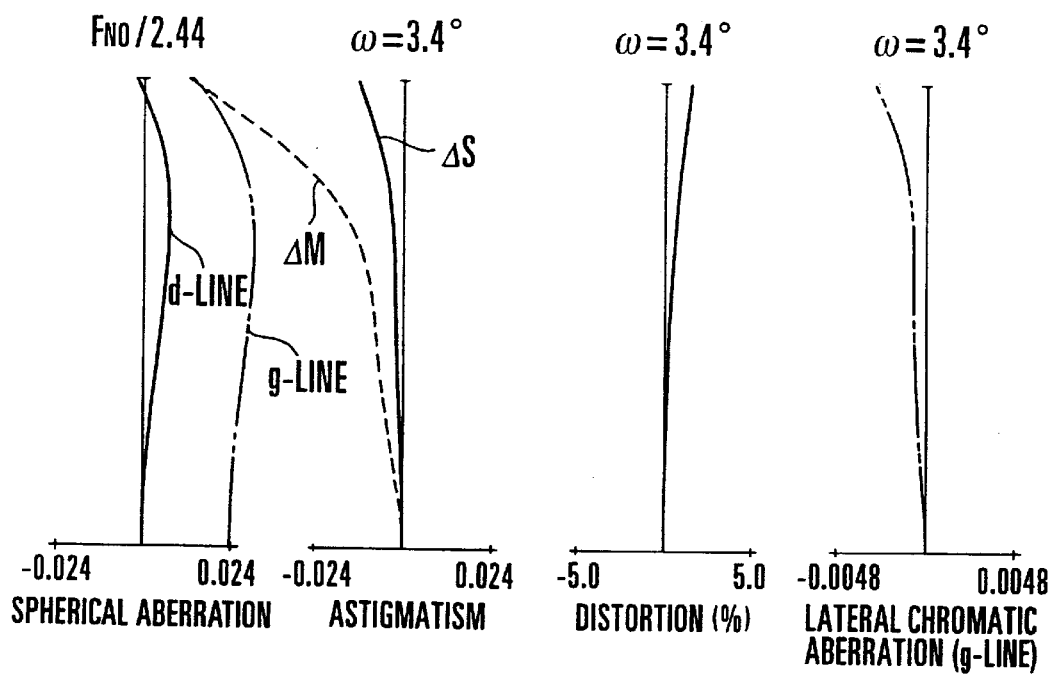

VIBRATION OCCURRING

LENS UNIT SHIFTING

IMAGE BEING STABILIZED

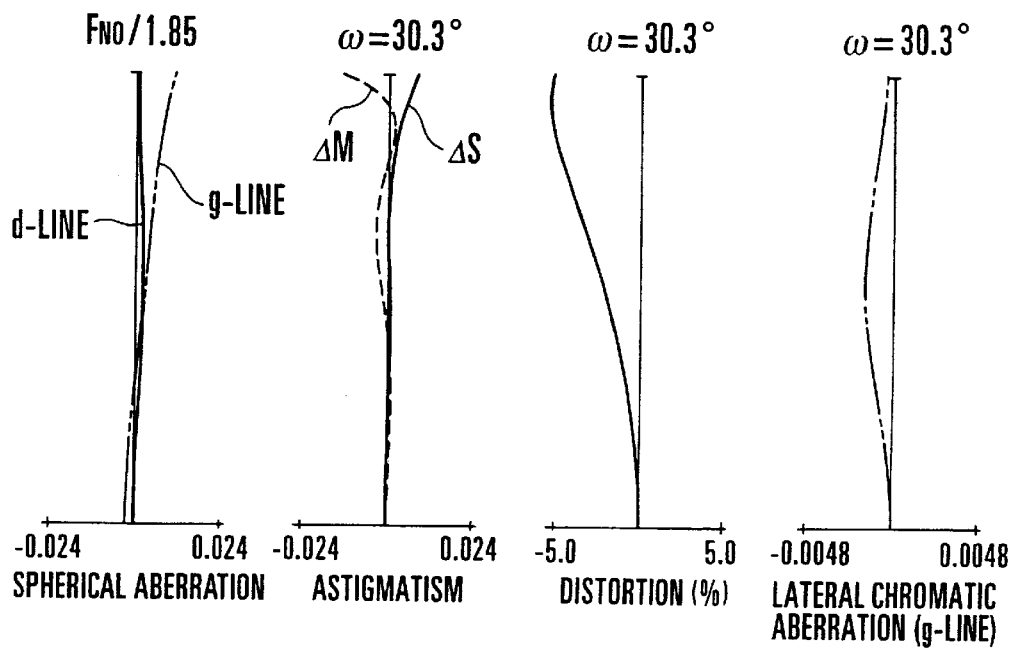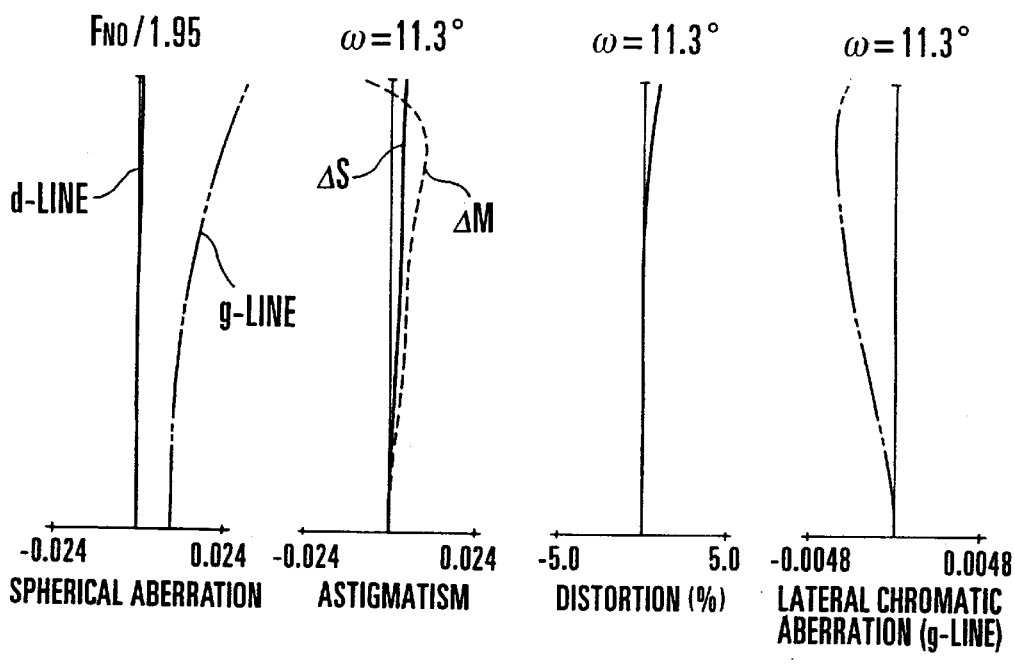

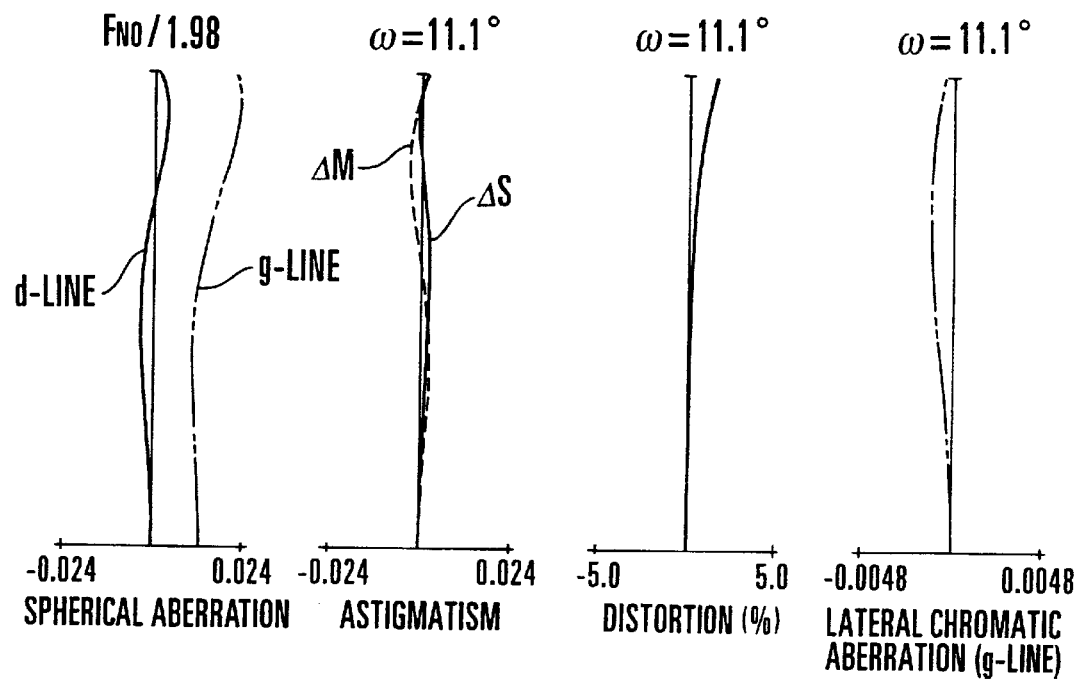
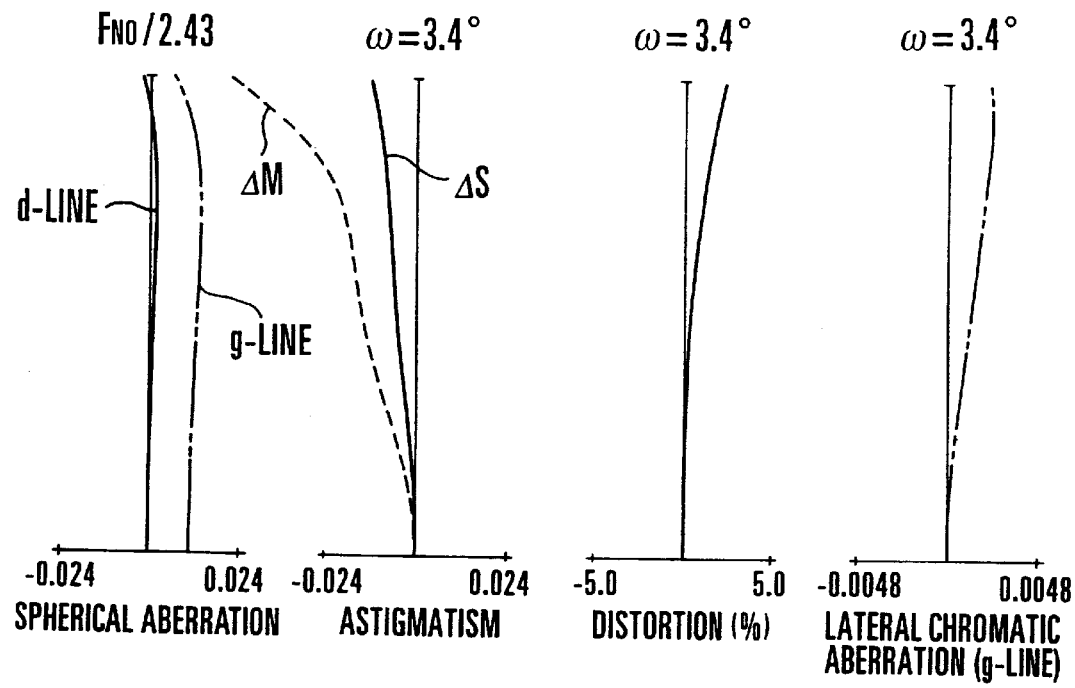

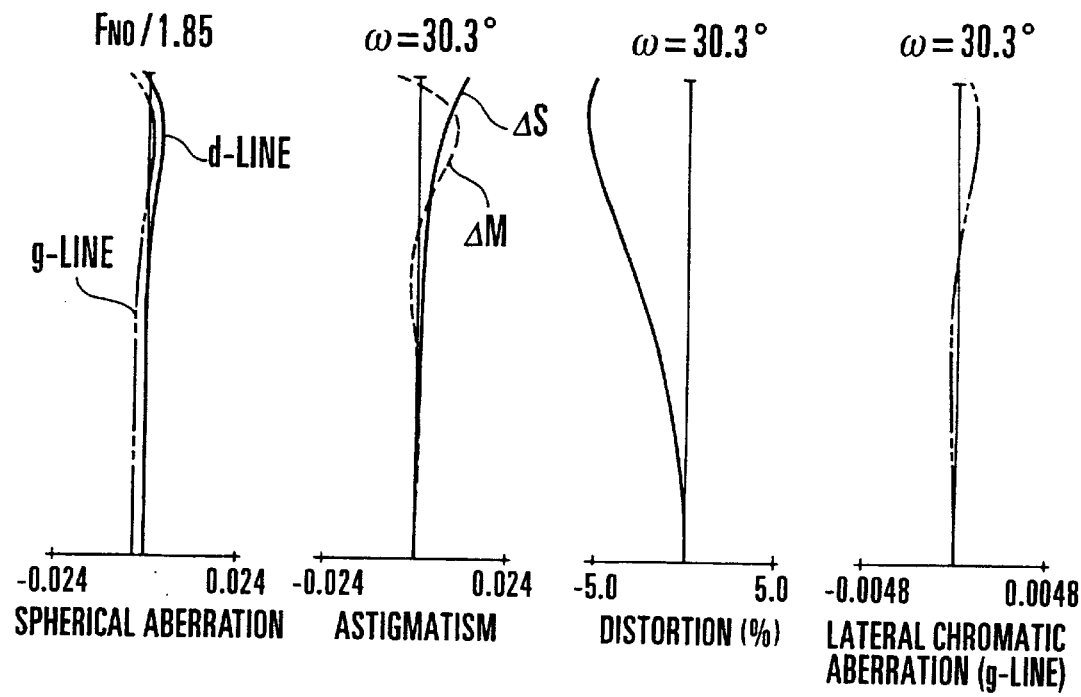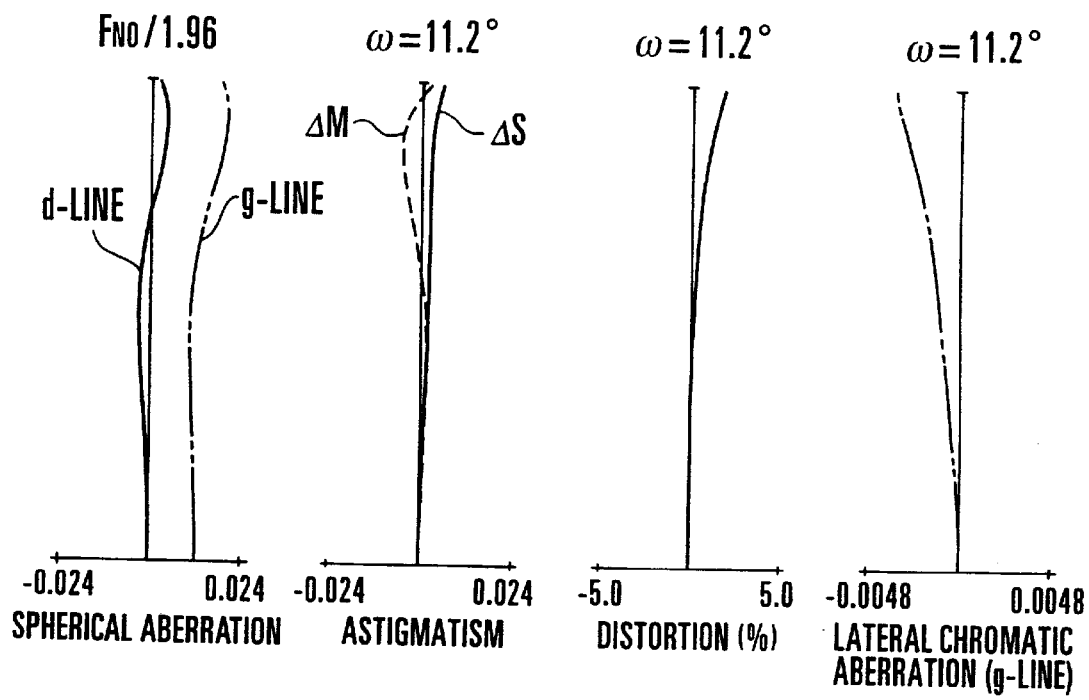

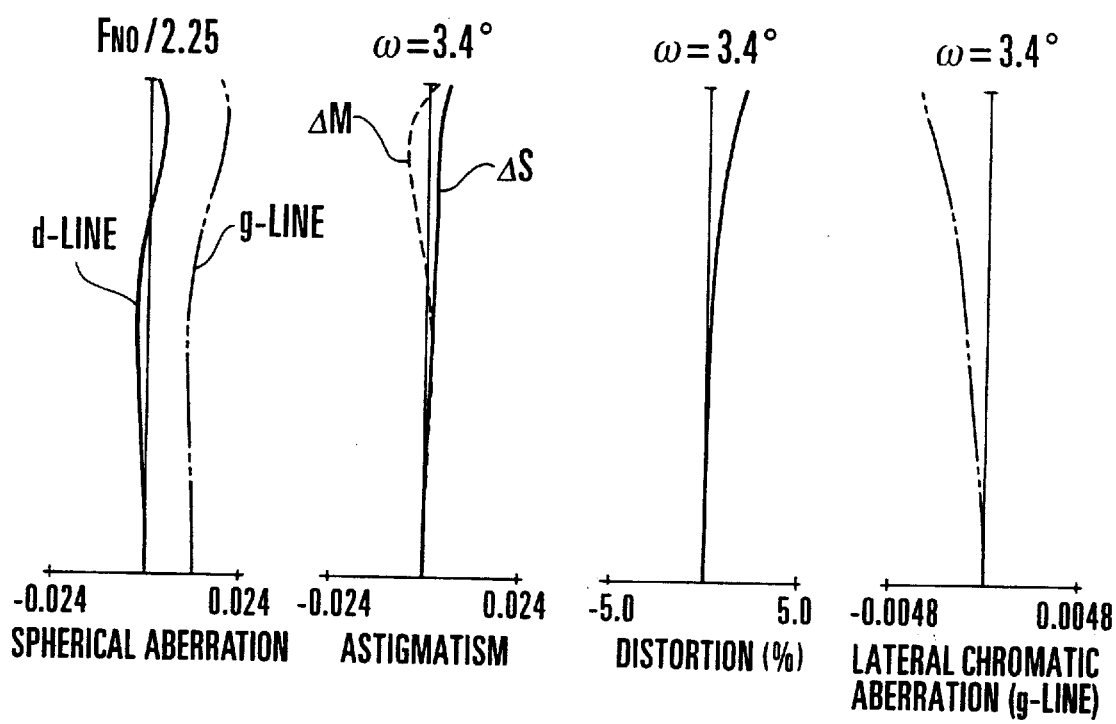

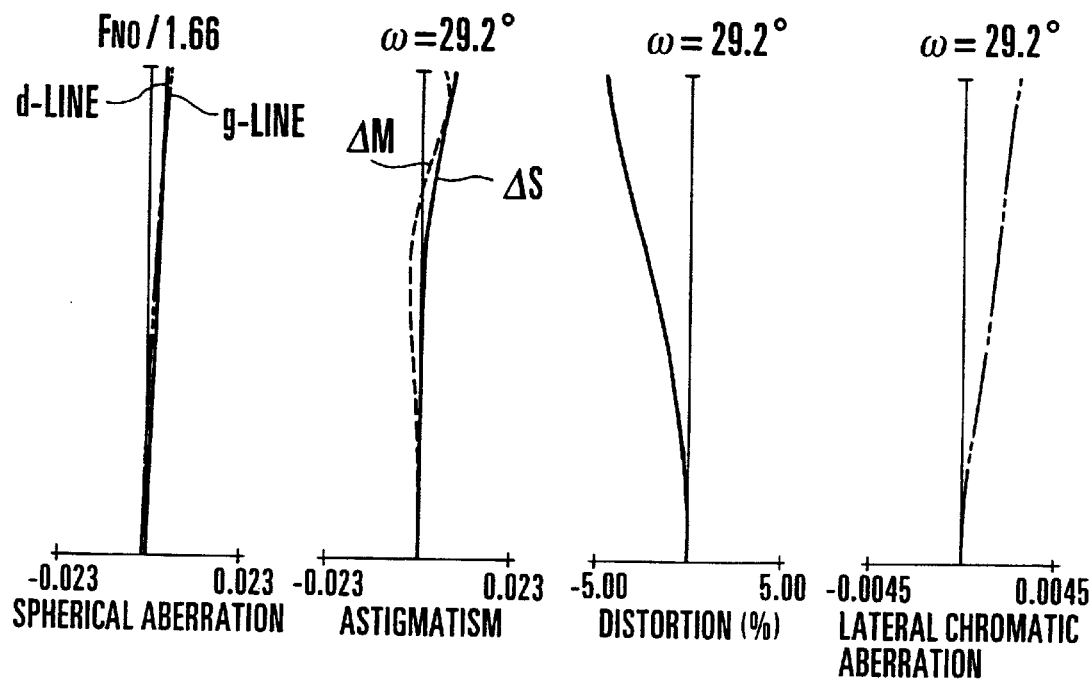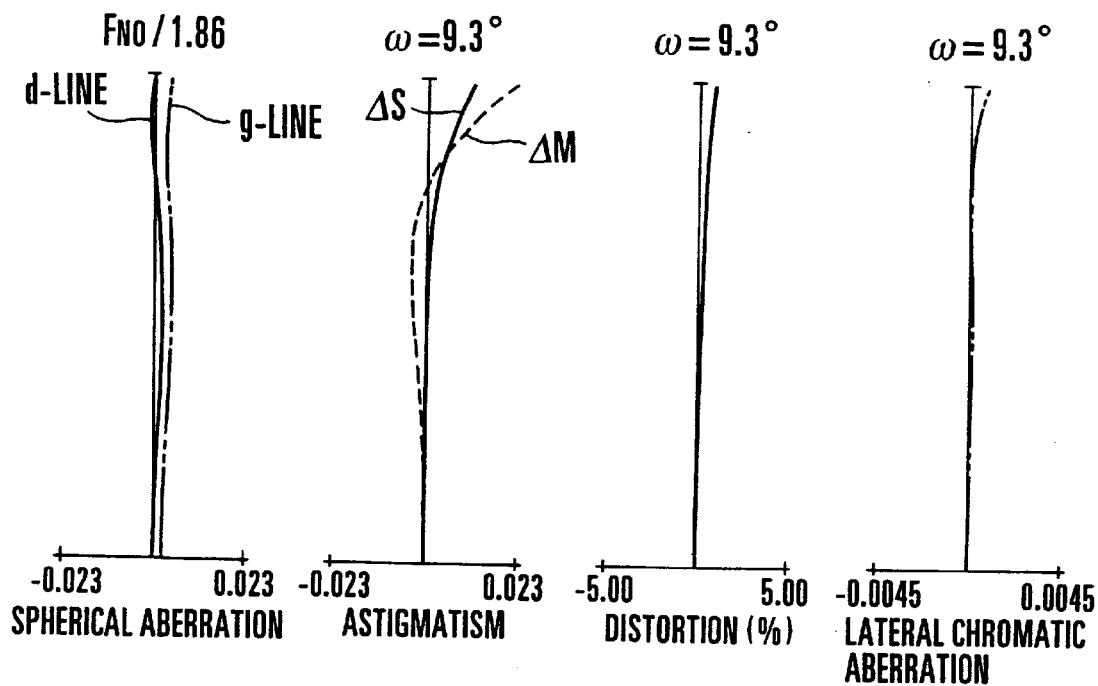

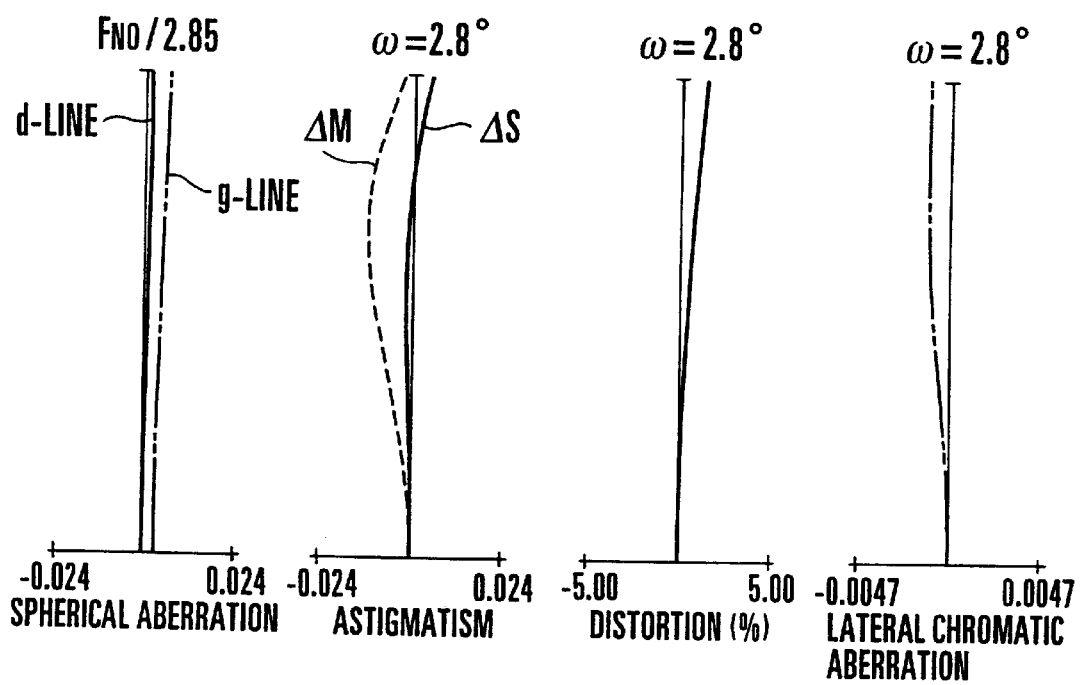

VARIABLE MAGNIFICATION OPTICAL SYSTEM HAVING IMAGE STABILIZING FUNCTION

This application is a divisional application of application Ser. No. 09/251,415 filed Feb. 17, 1999, which is now pending and which is a continuation-in-part of application Ser. No. 09/037,856 filed Mar. 10, 1998, which is now abandoned.

BACKGROUND OF THE INVENTION

1. Field of the Invention

The present invention relates to variable magnification optical systems having an image stabilizing function and, more particularly, to variable magnification optical systems having an image stabilizing function suited to photographic cameras or video cameras, in which a lens unit constituting part of the variable magnification optical system is moved in a direction perpendicular to an optical axis so as to optically compensate for the shaking of a picked-up image obtained when the variable magnification optical system vibrates (tilts), so that the picked-up image is maintained stable.

2. Description of Related Art

When shooting is performed with a photographing system on a running car, a flying air plane or the like moving vehicle, vibrations propagate to the photographing system, so that shaking would be caused in the picked-up image.

To prevent the occurrence of such image shaking, there have been many previous proposals for stabilizing the image formed in the optical system.

For example, in Japanese Patent Publication No. Sho 56-21133, in accordance with the output signal of a detecting means for detecting a vibration state of an optical apparatus, an optical member constituting part of the optical apparatus is moved in such a direction as to cancel the vibrating displacement of an image caused by the vibration of the optical apparatus, so that the image is maintained stable.

In Japanese Laid-Open Patent Application No. Sho 61-223819, in a photographing system provided with a variable angle prism of the refracting type arranged at the frontmost position thereof, an apex angle of the variable angle prism is varied in correspondence to the vibration of the photographing system so as to deflect an image, thereby stabilizing the image.

In Japanese Patent Publications No. Sho 56-34847 and No. Sho 57-7414, etc., an optical member, which is spatially fixed against the vibration of a photographing system, is disposed in part of the photographing system, and a prism effect produced by the optical member against the vibration is utilized to deflect a picked-up image, thereby stabilizing the image on a focal plane.

In Japanese Laid-Open Patent Applications No. Hei 1-116619 and No. Hei 2-124521, an acceleration sensor or the like is utilized to detect the vibration of a photographing system, and, in response to the detection signal obtained therefrom, a lens unit constituting part of the photographing system is vibrated in a direction perpendicular to an optical axis so as to stabilize a picked-up image.

Also, Japanese Laid-Open Patent Application No. Hei 7-128619 discloses a variable magnification optical system comprising, in order from the object side, a first lens unit of positive refractive power which is stationary during focusing and during zooming, a second lens unit of negative refractive power which has a magnification varying function, an aperture stop, a third lens unit of positive refractive power, and a fourth lens unit of positive refractive power, which has both the function of compensating for the shifting of the image with the variation of the magnification and the focusing function, wherein the third lens unit is composed of two lens sub-units, i.e., a first lens sub-unit of negative refractive power and a second lens sub-unit of positive refractive power, and the second lens sub-unit is moved in a direction perpendicular to an optical axis so as to compensate for the shaking of a picked-up image when the variable magnification optical system vibrates.

In Japanese Laid-Open Patent Application No. Hei 7-199124, in a 4-unit-type variable magnification optical system of a plus-minus-plus-plus refractive power arrangement, the entirety of the third lens unit is vibrated in a direction perpendicular to an optical axis so as to stabilize a picked-up image.

Meanwhile, Japanese Laid-Open Patent Application No. Hei 5-60974 discloses another 4-unit-type variable magnification optical system of a plus-minus-plus-plus refractive power arrangement, wherein the third lens unit is composed of a positive lens and a negative lens of meniscus form in the form of the telephoto type, thereby producing the advantage of reducing the total length of the entire system.

In general, the use of the method of stabilizing a picked-up image by disposing the image stabilizing optical system in front of the photographing system and vibrating a movable lens unit constituting part of the image stabilizing optical system so as to compensate for the shaking of the picked-up image causes a problem to arise in that the entire apparatus becomes larger in size and that an operating mechanism for moving the movable lens unit becomes complicated in structure.

Further, there is even a more serious problem, too, that when the movable lens unit is vibrated, a great amount of decentering aberrations would be produced with the result of a large deterioration of the optical performance.

In an optical system using the variable angle prism in stabilizing a picked-up image, there is a problem that the amount of decentering lateral chromatic aberrations produced during the image stabilization would increase, particularly, on the side of long focal lengths (telephoto side).

On the other hand, in an optical system in which a lens unit constituting part of the photographing system is vibrated in a direction perpendicular to the optical axis so as to stabilize a picked-up image, there is, an advantage that any additional optical unit dedicated to the image stabilization is unnecessary. However, there are problems that a surplus space has to be provided in the optical system so as to move the vibrating lens unit and that the amount of decentering aberrations produced during the image stabilization would increase greatly.

Further, in the 4-unit type variable magnification optical system described above which comprises positive, negative, positive and positive lens units, if the third lens unit is composed of a positive lens and a negative meniscus lens in the form of telephoto type for the purpose of shortening of the total length of the entire system, large decentering aberrations, particularly, distortional aberrations, are produced when the whole third lens unit is moved in a direction perpendicular to the optical axis to stabilize a picked-up image. In the case of applying such a variable magnification optical system to the apparatus for taking motion pictures, such as video cameras, there is a problem that the deformation of a picked-up image during the image stabilization becomes conspicuous.

BRIEF SUMMARY OF THE INVENTION

In accordance with the present invention, a relatively small-sized, light-weight lens unit constituting part of a variable magnification optical system is moved in a direction perpendicular to an optical axis so as to compensate for the shaking of an image when the variable magnification optical system vibrates (tilts). By setting forth proper rules of design for the construction and arrangement of constituent lenses of the lens unit, the size of the entire system is minimized, the structure of an operating mechanism is simplified, and the load on a driving means is reduced, while still permitting the amount of decentering aberrations produced during the movement of the lens unit to be suppressed to a minimum. It is, therefore, an object of the invention to provide a variable magnification optical system having an image stabilizing function that is corrected well for decentering aberrations.

To attain the above object, in accordance with an aspect to the invention, there is provided a variable magnification optical system having an image stabilizing function, which comprises, in order from an object side to an image side, a fixed first lens unit of positive refractive power, a second lens unit of negative refractive power, a third lens unit of positive refractive power and a fourth lens unit of positive refractive power, the second lens unit and the fourth lens unit being moved to effect a variation of magnification, wherein the third lens unit has a negative lens of meniscus form concave toward the image side and an aspheric surface, and the third lens unit is movable in a direction perpendicular to an optical axis to stabilize an image.

In accordance with another aspect of the invention, there is provided a variable magnification optical system having an image stabilizing function, which comprises, in order from an object side to an image side, a fixed first lens unit of positive refractive power, a second lens unit of negative refractive power, a third lens unit of positive refractive power and a fourth lens unit of positive refractive power, the second lens unit and the fourth lens unit being moved to effect a variation of magnification, wherein the third lens unit has two lens sub-units of positive refractive power, one of which is fixed, and the other of which is movable in a direction perpendicular to an optical axis to stabilize an image.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 6A to 6D are graphic representations of the aberrations of the numerical example 1 of the invention in a middle focal length position.

FIGS. 7A to 7D are graphic representations of the aberrations of the numerical example 1 of the invention at the telephoto end.

FIGS. 8A to 8D are graphic representations of the aberrations of the numerical example 2 of the invention at the wide-angle end.

FIGS. 9A to 9D are graphic representations of the aberrations of the numerical example 2 of the invention in a middle focal length position.

FIGS. 10A to 10D are graphic representations of the aberrations of the numerical example 2 of the invention at the telephoto end.

FIGS. 11A to 11D are graphic representations of the aberrations of the numerical example 3 of the invention at the wide-angle end.

FIGS. 12A to 12D are graphic representations of the aberrations of the numerical example 3 of the invention in a middle focal length position.

FIGS. 13A to 13D are graphic representations of the aberrations of the numerical example 3 of the invention at the telephoto end.

FIGS. 18A to 18D are graphic representations of the aberrations of the numerical example 4 of the invention at the wide-angle end.

FIGS. 19A to 19D are graphic representations of the aberrations of the numerical example 4 of the invention in a middle focal length position.

FIGS. 22A to 22D are graphic representations of the aberrations of the numerical example 5 of the invention in a middle focal length position.

FIGS. 23A to 23D are graphic representations of the aberrations of the numerical example 5 of the invention at the telephoto end.

FIGS. 24A to 24D are graphic representations of the aberrations of the numerical example 6 of the invention at the wide-angle end.

FIGS. 25A to 25D are graphic representations of the aberrations of the numerical example 6 of the invention in a middle focal length position.

FIGS. 26A to 26D are graphic representations of the aberrations of the numerical example 6 of the invention at the telephoto end.

FIGS. 31A to 31D are graphic representations of the various aberrations of the numerical example 7 at the wide-angle end.

FIGS. 32A to 32D are graphic representations of the various aberrations of the numerical example 7 in a middle focal length position.

FIGS. 39A to 39D are graphic representations of the various aberrations of the numerical example 9 at the telephoto end.

DETAILED DESCRIPTION OF THE INVENTION

Hereinafter, preferred embodiments of the invention will be described in detail with reference to the drawings.

Figure 1:
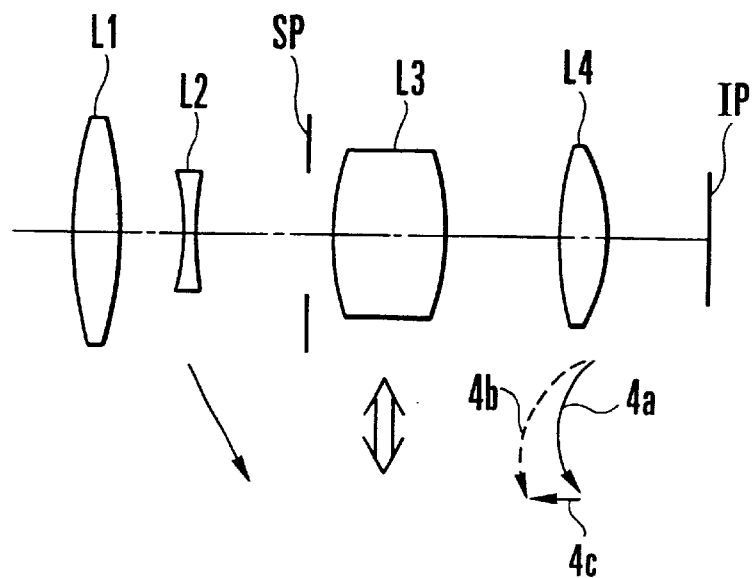
FIG. 1 is a schematic diagram of the paraxial refractive power arrangement of a variable magnification optical system according to the invention.
Figure 2:
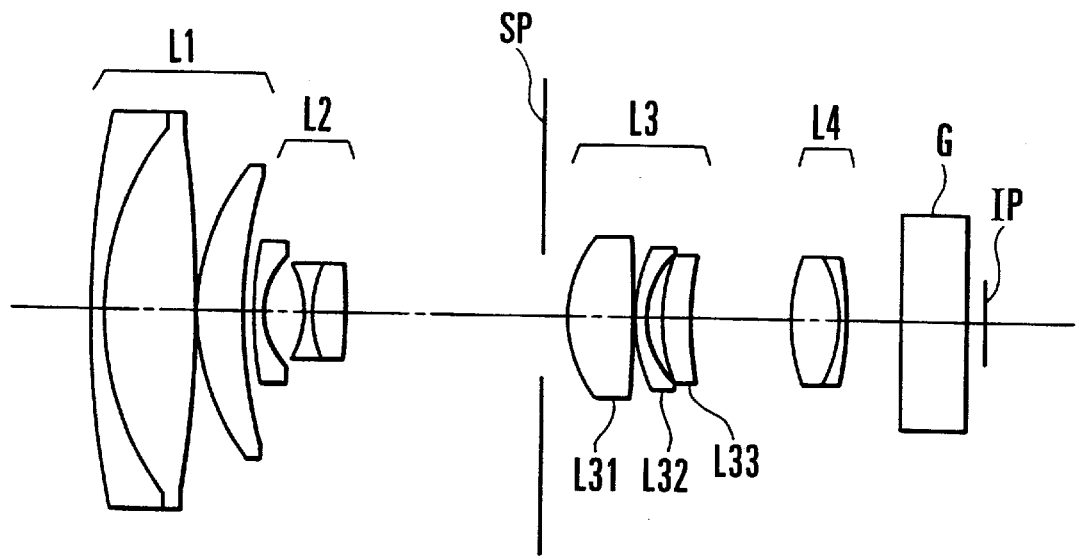
FIG. 2 is a lens block diagram of a numerical example 1 of the invention in the wide-angle end.
Figure 3A:
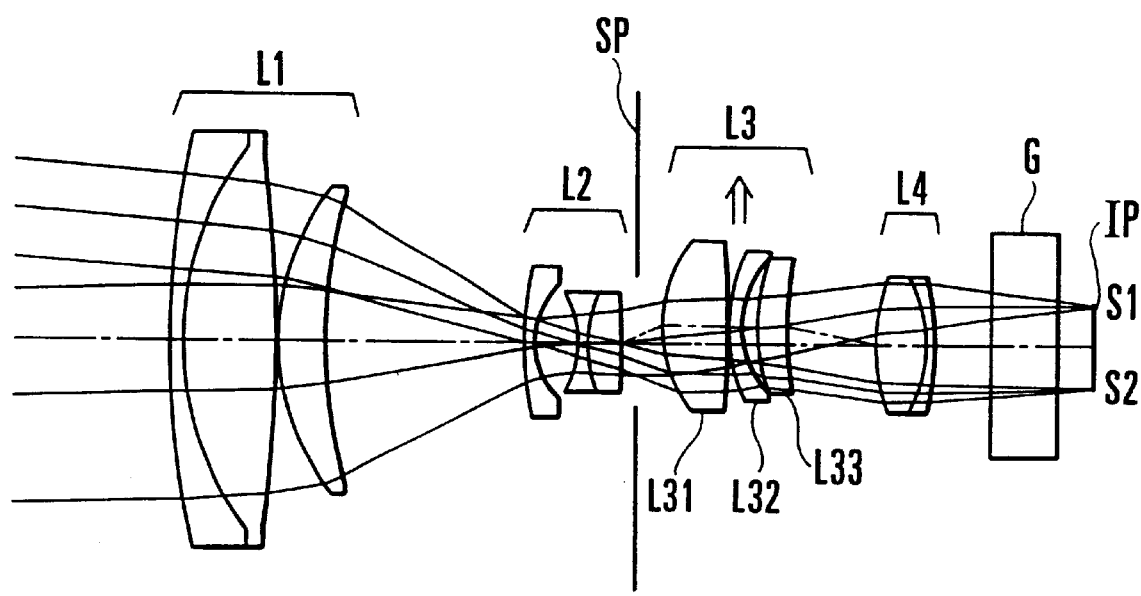
FIG. 3A is a lens block diagram of a numerical example 2 of the invention at the wide-angle end.
Figure 4:
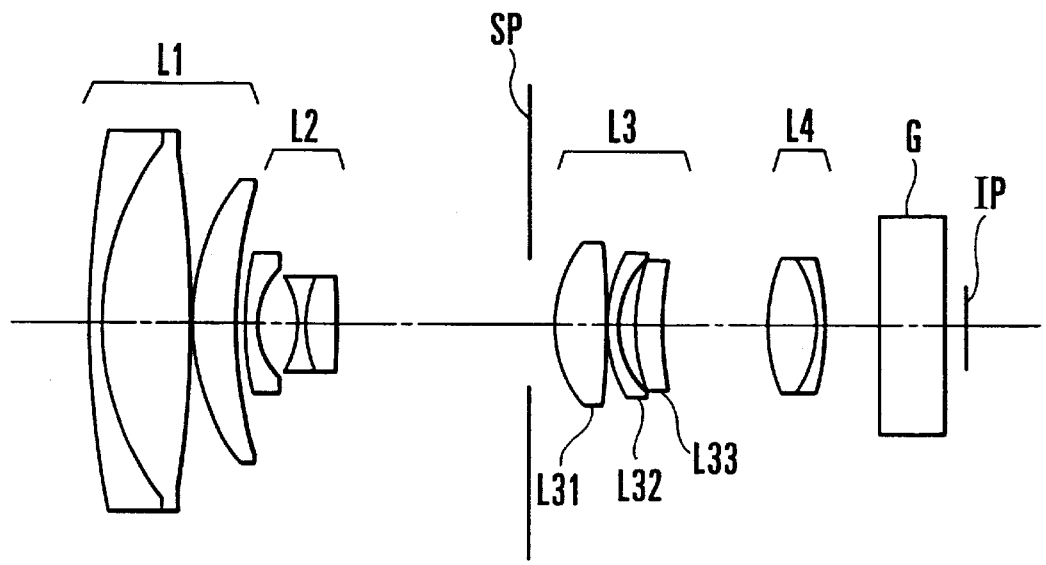
FIG. 4 is a lens block diagram of a numerical example 3 of the invention at the wide-angle end.
Figures 5A, 5B, 5C, 5D:
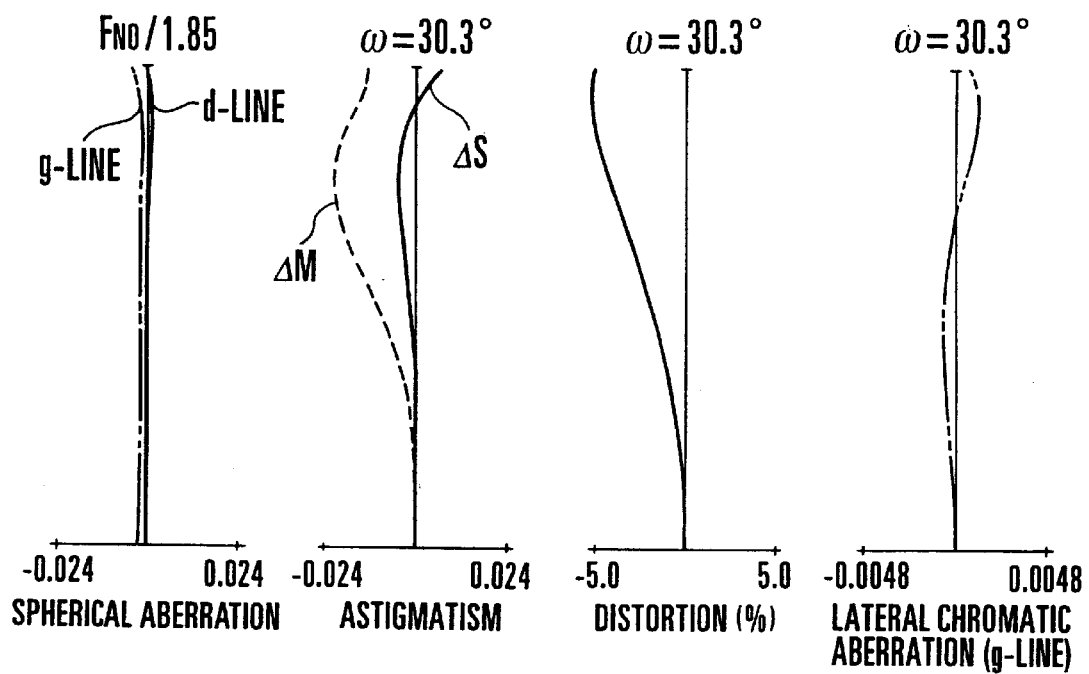
FIGS. 5A to 5D are graphic representations of the aberrations of the numerical example 1 of the invention at the wide-angle end.

FIG. 1 shows a thin lens system whose paraxial refractive power arrangement is equivalent to those of the numerical examples 1 to 3 of an embodiment of the invention, which will be described more fully later. FIGS. 2, 3A and 4 are longitudinal section views of the numerical examples 1 to 3 of variable magnification optical systems of the invention at the wide-angle end, respectively.

In these figures, reference character L1 denotes a first lens unit of positive refractive power, reference character L2 denotes a second lens unit of negative refractive power, and reference character L3 denotes a third lens unit of positive refractive power.

In this embodiment, the third lens unit L3 is made to move in a direction perpendicular to an optical axis to compensate for the shaking of an image on the focal plane when the variable magnification optical system vibrates (or tilts.)

Reference character L4 denotes a fourth lens unit of positive refractive power. Reference character SP stands for an aperture stop positioned in front of the third lens unit L3, reference character G stands for a glass block such as face plate, and reference character IP stands for an image plane.

In the present embodiment, during zooming from the wide-angle end to the telephoto end, as shown by the arrows, the second lens unit moves toward the image side, while simultaneously moving the fourth lens unit to compensate for the shifting of the image with variation of the magnification.

The fourth lens unit is also made to axially move for focusing purposes. That is, the rear focusing method is employed. A curved solid line 4a and a curved dashed line 4b in FIG. 1 show the loci of motion of the fourth lens unit to compensate for the shifting of the image with zooming from the wide-angle end to the telephoto end when focused on an infinitely distant object and a close object, respectively. Incidentally, the first and third lens units remain stationary during zooming and during focusing.

In the present embodiment, the function of compensating for the shifting of the image with zooming and the focusing function both are performed by moving one and the same lens unit, i.e., the fourth lens unit. In particular, as shown by the curved lines 4a and 4b in FIG. 1, the total zooming movement depicts a locus convex toward the object side. This assures efficient utilization of the space between the third lens unit and the fourth lens unit, thus achieving a much desired shortening of the total length of the entire optical system.

In the present embodiment, with the setting in, for example, the telephoto end, during focusing from an infinitely distant object to a close object, the fourth lens unit moves forward as shown by a straight line 4c in FIG. 1.

The optical system in the present embodiment takes a zoom type in which the first and second lens units as a composite system form a virtual image that is focused to a real image on a photosensitive surface by the third and fourth lens units.

In the present embodiment, as compared with the conventional so-called 4-component zoom lens that moves the first component forward to effect focusing, the effective diameter of the first lens unit is prevented from becoming larger, by employing the rear focusing method described above with an advantage of defending the performance against deterioration due to an error of axial alignment of the first lens unit.

Then, by locating the aperture stop just in front of the third lens unit, the variation of aberrations of the movable lens units is lessened, and the axial separation between the lens units ahead of the aperture stop is shortened to facilitate reduction of the diameter of the front members of the first lens unit.

In the numerical examples 1 to 3 of the invention, the third lens unit L3 is made to move in a direction perpendicular to the optical axis so as to compensate for the shaking of the image when the variable magnification optical system vibrates. This enables the image to be stabilized, without having to add a novel optical member, such as the lens unit, for sole use in stabilizing the image, or a variable angle prism as is necessary in the prior art.

Next, for the variable magnification optical system to function as the image stabilizing system, because, according to the invention, the shaking of the image on the focal plane is compensated for by moving the lens unit in the direction perpendicular to the optical axis, the optical principle to be used will be explained by using FIGS. 14A to 14D.

Figure 14A:
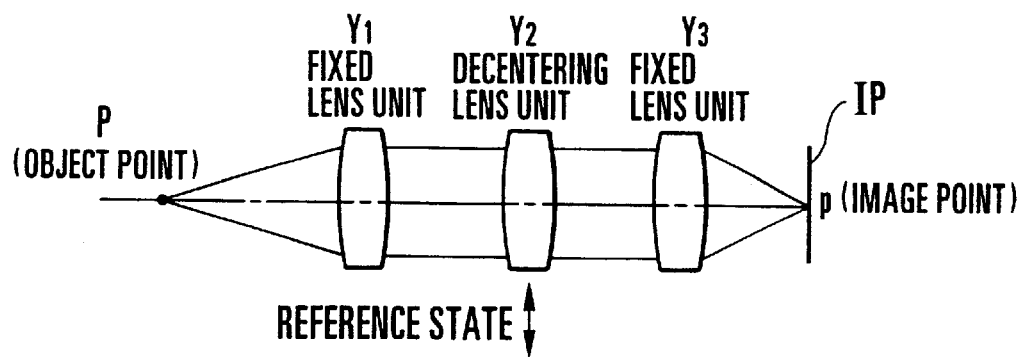
FIGS. 14A to 14D are schematic diagrams for explaining the optical principle of the image stabilizing system according to the invention.

As shown in FIG. 14A, an optical system in question is assumed to comprise three parts, i.e., a fixed lens unit Y1, a decentering lens unit Y2 and a fixed lens unit Y3. An object point P on the optical axis located sufficiently away from the optical system is assumed to cast itself as an image point p at the center on the focal plane IP.

Figure 14B:
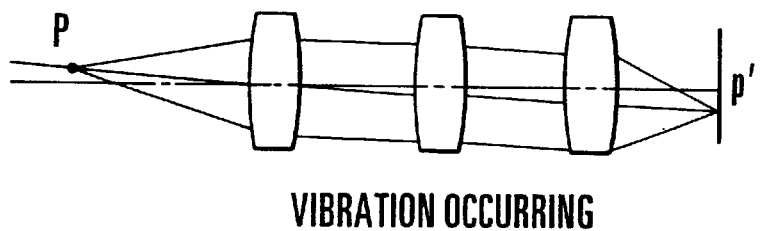
Figure 14C:
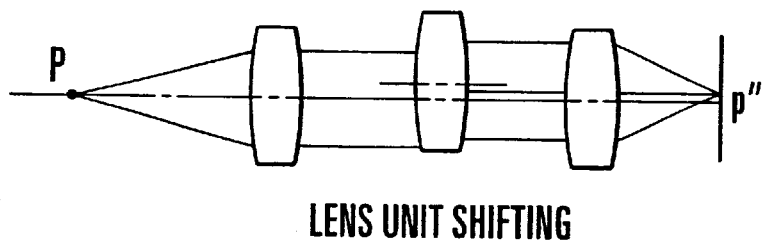

Now, suppose the optical system with inclusion of the focal plane IP instantaneously tilts by vibration as shown in FIG. 14B, then the object point P also instantaneously moves its image to a point p', shaking the image.

Meanwhile, if the decentering lens unit Y2 moves in a direction perpendicular to the optical axis, then the image point p shifts to a position p". The resultant amount and direction of the movement of the image point p depend on the power arrangement, being expressed as the decentering sensitivity of that lens unit.

Figure 14D:
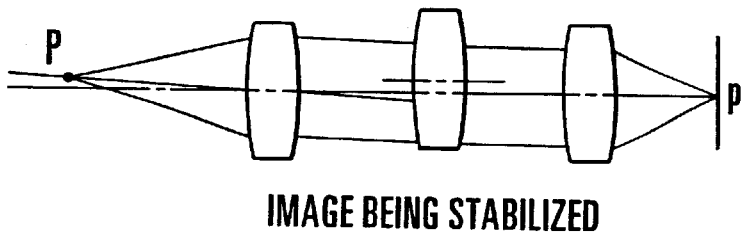

On this account, the decentering lens unit Y2 is made to move in an appropriate direction perpendicular to the optical axis and by an appropriate distance so as to bring the displaced image point p' in FIG. 14B to the initial position p. As shown in FIG. 14D, the shake compensation or image stabilization is thus performed.

Now assuming that the optical axis has inclined to θ° and letting the focal length of the entire optical system be denoted by f and the decentering sensitivity of the lens unit Y2 for shifting by TS, the required amount of (shifting) movement, Δ, of the decentering lens unit Y2 for correcting the inclination is given by the following equation:

$$\Delta = f \cdot \tan(\theta)/TS.$$

If the decentering sensitivity TS of the lens unit for shifting is too large, the amount of movement Δ takes a small value. Therefore, the required amount of movement for stabilizing the image can be made small, but it becomes difficult to control the movement with an accuracy high enough to stabilize the image. So, an inadequate correction results.

Particularly for the video camera or digital still camera, because, as the image size of the sensor, such as CCD, is smaller than for the silver halide film, the equivalent focal length to the same image angle is shorter, the shifting lens unit has to move a shorter distance, Δ, to correct the same angle.

Hence, if the precision accuracy of the operating mechanism is on the same order, it results that the insufficiency of correction becomes relatively large.

If the decentering sensitivity TS is too small, on the other hand, the required amount for control of movement of the lens unit for shifting becomes large and the actuator or like driving means for moving the lens unit for shifting also becomes large.

In the present invention, the refractive power arrangement of the lens units is made appropriate to determine the decentering sensitivity TS of the third lens unit at a proper value, thus achieving an optical system which is less inadequate to correct for stabilizing the image due to the control tolerance of the mechanisms and which lays a smaller load on the driving means such as actuator.

In the present embodiment, the third lens unit is composed of a positive lens L31 of which both lens surfaces are convex, a negative lens L32 of meniscus form having a strong concave surface facing the image side and a positive lens L33 of meniscus form convex toward the object side, as arranged in this order from the object side.

In the numerical examples 1 and 2 shown in FIG. 2 and FIG. 3A, respectively, the front surface (on the object side) of the positive lens L31 and the rear surface (on the image side) of the positive lens L33 are formed to aspheric shapes.

Using the negative lens of meniscus form concave toward the image side, the third lens unit as a whole takes the telephoto form. Accordingly, the interval between the principal points of the second and third lens units is shortened, thus achieving a shortening of the total length of the optical system.

In a case where such a negative meniscus lens is introduced, its surfaces produce positive distortion.

Now suppose that the third lens unit as a whole has positive distortion and that the third lens unit as a whole has moved upward as shown in FIG. 3A for the purpose of stabilizing an image. At this time, an off-axial ray which advances to a point S1 passes through the third lens unit at a lower height. So, the positive distortion decreases. For another off-axial ray which advances to a point S2, the positive distortion increases. Therefore, an object of rectangular shape, when imaged, deforms to a trapezoid, such as that shown by solid lines in FIG. 3B.

Figure 3B:
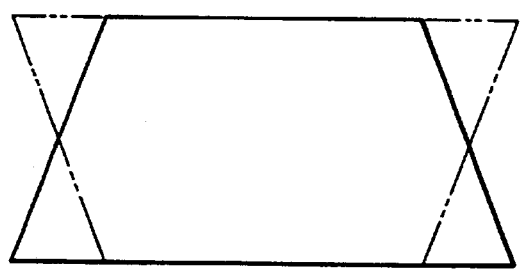
FIG. 3B is a diagram of geometry for explaining the distortional aberration.

Conversely, when the third lens unit has moved downward, the deformation is like that shown by dashed lines in FIG. 3B. As vibrations are given, the deformation of the image changes. Particularly in motion pictures, the viewer is made uncomfortable. To reduce this deformation, one need only decrease the distortion produced by the whole third lens unit.

In the numerical examples 1 and 2, the positive lens L33 is positioned on the image side of the negative meniscus lens L32 and has its rear surface provided with an asphere. Accordingly, while keeping the telephoto form, the distortion is corrected in the third lens unit. The decentering distortion produced when the image is stabilized by shifting the third lens unit is thus reduced.

Also, since, in the numerical examples 1 and 2, the lens L31 is provided with an aspheric surface at the front surface, the spherical aberration is suppressed in the third lens unit, which in turn reduces the decentering coma in stabilizing the image.

In the numerical examples 3 shown in FIG. 4, the negative lens L32 of meniscus form is provided with an aspheric surface at the rear surface. Accordingly, while keeping the telephoto form, the distortion is corrected in the third lens unit. The decentering distortion produced when the image is stabilized by shifting the third lens unit is thus reduced. The lens L31, too, is provided with an aspheric surface at the front surface to suppress the spherical aberration and coma within the third lens unit. The decentering coma is thus reduced in stabilizing the image.

The features described above, when satisfied, realize the variable magnification optical system having the image stabilizing function according to the invention. To further improve the optical performance, while still maintaining the shortening of the total length of the optical system to be achieved, it is preferable to satisfy at least one of the following conditions.

(i-1) The focal length f3N of the negative lens L32 in terms of the focal length f3 of the third lens unit lies in the following range:

$$1.0 < |f3N/f3| < 1.6 \tag{1}.$$

The inequalities of condition (1) have an aim to make up the third lens unit in the telephoto type to thereby achieve a compact form of the entirety of the optical system. When the lower limit of the condition (1) is exceeded, as this means that the refractive power of the negative lens L32 in the third lens unit is too strong, it is easier to shorten the total length of the optical system, but the Petzval sum increases in the negative sense so that the curvature of field is difficult to correct. Conversely, when the upper limit is exceeded, the total length of the optical system is left insufficiently shortened. (i-2) The focal length f3 of the third lens unit in terms of the focal length fW at the wide-angle end of the entire optical system lies in the following range:

$$2.3 < f3/fW < 4.0 \tag{2}.$$

The inequalities of condition (2) have an aim to make a good compromise between the shortening of the total length of the optical system and the proper decentering sensitivity of the shift lens unit, thus maintaining good performance in stabilizing the image. When the refractive power of the third lens unit is too strong as exceeding the lower limit of the condition (2), the decentering sensitivity of the shift lens unit becomes unduly high. So, the precision accuracy of the operating mechanism must be made severe. Otherwise, the inadequacy of correction would remain large in stabilizing the image. Conversely, when the refractive power of the third lens unit is weakened beyond the upper limit, in some cases, the shifting amount of the third lens unit for stabilizing the image increases greatly.

(i-3) The focal length f2 of the second lens unit lies in the following range:

$$0.23 < |f2/\sqrt{fW \cdot fT}| < 0.35 \quad (3)$$

where fW and fT are the focal lengths at the wide-angle end and the telephoto end of the entire optical system, respectively.

When the lower limit of the condition (3) is exceeded, as this means that the focal length of the second lens unit is too strong, the total length of the optical system is easy to shorten, but it becomes objectionably difficult to correct the field curvature and distortion for good stability throughout the entire zooming range. When the refractive power of the second lens unit is too weak over the upper limit of the condition (3), the required movement for the given zoom ratio of the second lens unit increases unduly greatly.

Also, for the image stabilizing optical system according to the invention to secure a compensating angle large enough to stabilize the image in most situations in such a manner that the optical performance is maintained stable throughout the entire range of compensating angles, it is preferable to satisfy the following condition:

$$3.5 \times 10^{-3} < \frac{Dm(1-\beta 3t)\beta 4t}{fT} < 5.2 \times 10^{-2} \quad (4)$$

where Dm is the possible maximum movement of the third lens unit when stabilizing the image, and $\beta 3t$ and $\beta 4$ are the paraxial lateral magnifications at the telephoto end of the third lens unit and the fourth lens unit, respectively.

When the lower limit of the condition (4) is exceeded, the compensating angle for stabilizing the image becomes small, so that the image stabilizing effect becomes small. When the upper limit is exceeded, the stabilization of the image causes deterioration of the optical performance and conspicuous changes of the light amount Next, the numerical examples 1 to 3 of the invention are shown with the numerical data in tables below, where Ri is the radius of curvature of the i-th lens surface when counted from the object side, Di is the i-th lens thickness or air separation when counted from the object side, and Ni and vi are respectively the refractive index and Abbe number of the glass of the i-th lens element when counted from the object side.

The values of the factors in the above-described conditions (1) to (4) for the numerical examples 1 to 3 are listed in Table-1.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1+\sqrt{1-(H/R)^2}} + AH^2 + BH^4 + CH^6 + DH^8 + EH^{10}$$

where R is the radius of the osculating sphere, and A, B, C, D and E are the aspheric coefficients. The values of the aspheric coefficients are also tabulated where the notation: "e–0X" means $10^{-x}$.

NUMERICAL EXAMPLE 1

| f = 1–9.75 | Fno = 1.85–2.46 | 2ω = 60.5°–6.8° | |
|---|---|---|---|
| R1 = 12.404 | D1 = 0.18 | N1 = 1.84666 | v1 = 23.8 |
| R2 = 4.052 | D2 = 1.21 | N2 = 1.71299 | v2 = 53.8 |
| R3 = –17.341 | D3 = 0.04 | | |
| R4 = 3.150 | D4 = 0.60 | N3 = 1.77249 | v3 = 49.6 |
| R5 = 6.789 | D5 = Variable | | |
| R6 = 4.605 | D6 = 0.14 | N4 = 1.88299 | v4 = 40.8 |
| R7 = 1.042 | D7 = 0.54 | | |
| R8 = –1.239 | D8 = 0.12 | N5 = 1.71299 | v5 = 53.8 |
| R9 = 1.474 | D9 = 0.44 | N6 = 1.84666 | v6 = 23.8 |
| R10 = –10.154 | D10 = Variable | | |
| R11 = Stop | D11 = 0.33 | | |
| *R12 = 1.589 | D12 = 0.86 | N7 = 1.66910 | v7 = 55.4 |
| R13 = –20.729 | D13 = 0.04 | | |
| R14 = 2.119 | D14 = 0.14 | N8 = 1.84666 | v8 = 23.8 |
| R15 = 1.189 | D15 = 0.21 | | |
| R16 = 2.082 | D16 = 0.40 | N9 = 1.58312 | v9 = 59.4 |
| *R17 = 4.282 | D17 = Variable | | |
| *R18 = 2.376 | D18 = 0.64 | N10 = 1.58312 | v10 = 59.4 |
| R19 = –1.744 | D19 = 0.12 | N11 = 1.84666 | v11 = 23.8 |
| R20 = –3.655 | D20 = 0.71 | | |
| R21 = ∞ | D21 = 0.88 | N12 = 1.51633 | v12 = 64.1 |
| R22 = ∞ | | | |

*Aspheric Surface

Aspheric Coefficients:

| R12: | K = –3.068e + 00 | B = 6.133e – 02 | C = –1.048e – 02 |
|---|---|---|---|
| | D = –4.205e – 03 | E = 2.843e – 03 | |
| R17: | K = –5.948e + 01 | B = 7.172e – 02 | C = –5.099e – 02 |
| | D = 5.965e – 03 | E = 0 | |
| R18: | K = –4.437e + 00 | B = 3.052e – 02 | C = –6.496e – 03 |
| | D = 9.474e – 03 | E = –1.915e – 03 | |

| Variable | Focal Length | | |
|---|---|---|---|
| Separation | 1.00 | 4.61 | 9.75 |
| D5 | 0.14 | 2.06 | 2.60 |
| D10 | 2.65 | 0.73 | 0.19 |
| D17 | 1.34 | 0.52 | 1.36 |

The Maximum Movement of the third Lens Unit: 0.320

NUMERICAL EXAMPLE 2

| f = 1–9.77 | Fno = 1.85–2.57 | 2ω = 59.4°–6.7° | |
|---|---|---|---|
| R1 = 12.041 | D1 = 0.17 | N1 = 1.80518 | v1 = 25.4 |
| R2 = 3.662 | D2 = 1.19 | N2 = 1.69679 | v2 = 55.5 |
| R3 = –15.896 | D3 = 0.04 | | |
| R4 = 2.995 | D4 = 0.59 | N3 = 1.77249 | v3 = 49.6 |
| R5 = 6.384 | D5 = Variable | | |
| R6 = 4.213 | D6 = 0.14 | N4 = 1.88299 | v4 = 40.8 |
| R7 = 0.999 | D7 = 0.52 | | |
| R8 = –1.184 | D8 = 0.12 | N5 = 1.69679 | v5 = 55.5 |

-continued

| | | | |
|---|---|---|---|
| R9 = 1.425 | D9 = 0.42 | N6 = 1.84666 | ν6 = 23.8 |
| R10 = −14.838 | D10 = Variable | | |
| R11 = Stop | D11 = 0.33 | | |
| *R12 = 1.485 | D12 = 0.70 | N7 = 1.66910 | ν7 = 55.4 |
| R13 = −15.967 | D13 = 0.03 | | |
| R14 = 2.006 | D14 = 0.14 | N8 = 1.84666 | ν8 = 23.8 |
| R15 = 1.169 | D15 = 0.24 | | |
| R16 = 2.449 | D16 = 0.35 | N9 = 1.58312 | ν9 = 59.4 |
| *R17 = 4.140 | D17 = Variable | | |
| *R18 = 2.346 | D18 = 0.63 | N10 = 1.58913 | ν10 = 61.2 |
| R19 = −1.584 | D19 = 0.12 | N11 = 1.84666 | ν11 = 23.8 |
| R20 = −3.394 | D20 = 0.70 | | |
| R21 = ∞ | D21 = 0.86 | N12 = 1.51633 | ν12 = 64.1 |
| R22 = ∞ | | | |

Aspheric Coefficients:

| | | | |
|---|---|---|---|
| R12: | K = −2.933e + 00 | B = 7.010e − 02 | C = −1.269e − 02 |
| | D = −4.760e − 03 | E = 3.375e − 03 | |
| R17: | K = −4.936e + 01 | B = 7.490e − 02 | C = −3.698e − 02 |
| | D = 7.116e − 03 | E = 0 | |
| R18: | K = −4.241e + 00 | B = 3.389e − 02 | C = −9.367e − 03 |
| | D = 1.652e − 02 | E = −5.909e − 03 | |

| Variable | Focal Length | | |
|---|---|---|---|
| Separation | 1.00 | 4.61 | 9.77 |
| D5 | 0.13 | 1.94 | 2.45 |
| D10 | 2.51 | 0.70 | 0.19 |
| D17 | 1.42 | 0.60 | 1.48 |

The Maximum Movement of the third Lens Unit: 0.150

NUMERICAL EXAMPLE 3

| f = 1–9.76 | Fno = 1.85–2.44 | 2ω = 60.5°–6.8° | |
|---|---|---|---|
| R1 = 13.534 | D1 = 0.18 | N1 = 1.84666 | ν1 = 23.8 |
| R2 = 4.112 | D2 = 1.21 | N2 = 1.71299 | ν2 = 53.8 |
| R3 = −16.831 | D3 = 0.04 | | |
| R4 = 3.173 | D4 = 0.60 | N3 = 1.77249 | ν3 = 49.6 |
| R5 = 6.780 | D5 = Variable | | |
| R6 = 4.370 | D6 = 0.14 | N4 = 1.83480 | ν4 = 42.7 |
| R7 = 1.013 | D7 = 0.57 | | |
| R8 = −1.234 | D8 = 0.12 | N5 = 1.69679 | ν5 = 55.5 |
| R9 = 1.525 | D9 = 0.44 | N6 = 1.84666 | ν6 = 23.8 |
| R10 = −11.259 | D10 = Variable | | |
| R11 = Stop | D11 = 0.33 | | |
| *R12 = 1.649 | D12 = 0.76 | N7 = 1.67790 | ν7 = 55.3 |
| R13 = −13.084 | D13 = 0.04 | | |
| R14 = 2.280 | D14 = 0.14 | N8 = 1.84666 | ν8 = 23.8 |
| *R15 = 1.243 | D15 = 0.18 | | |
| R16 = 2.016 | D16 = 0.40 | N9 = 1.58312 | ν9 = 59.4 |
| R17 = 4.117 | D17 = Variable | | |
| *R18 = 2.391 | D18 = 0.64 | N10 = 1.58913 | ν10 = 61.2 |
| R19 = −1.763 | D19 = 0.12 | N11 = 1.84666 | ν11 = 23.8 |
| R20 = −3.732 | D20 = 0.60 | | |
| R21 = ∞ | D21 = 0.88 | N12 = 1.51633 | ν12 = 64.1 |
| R22 = ∞ | | | |

Aspheric Coefficients:

| | | | |
|---|---|---|---|
| R12: | K = −3.240e + 00 | B = 6.578e − 02 | C = −1.729e − 02 |
| | D = −8.774e − 04 | E = 1.601e − 03 | |
| R15: | K = 1.204e − 01 | B = −2.688e − 03 | C = 1.003e − 02 |
| | D = −2.891e − 02 | E = 0 | |
| R18: | K = −3.069e + 00 | B = 2.134e − 02 | C = −4.778e − 03 |
| | D = 1.123e − 02 | E = −4.209e − 03 | |

| Variable | Focal Length | | |
|---|---|---|---|
| Separation | 1.00 | 4.47 | 9.76 |
| D5 | 0.15 | 2.13 | 2.69 |
| D10 | 2.74 | 0.75 | 0.19 |
| D17 | 1.64 | 0.81 | 1.63 |

The Maximum Movement of the third Lens Unit: 0.250

TABLE 1

| | | Numerical Example | | |
|---|---|---|---|---|
| | Condition | 1 | 2 | 3 |
| (1) | $|f3N/f3|$ | 1.233 | 1.318 | 1.256 |
| (2) | $f3/fW$ | 2.795 | 2.719 | 2.744 |
| (3) | $|f2/\sqrt{fW \cdot fT}|$ | 0.282 | 0.268 | 0.280 |
| (4) | $\dfrac{Dm(1 - \beta 3t)\beta 4t}{fT}$ | 0.0353 | 0.0167 | 0.0285 |

It will be appreciated from the foregoing that, according to the invention, as applied to the variable magnification optical system in which a lens unit of relatively small size and light weight moves in the direction perpendicular to the optical axis to compensate for the shaking of the image when the variable magnification optical system vibrates (tilts), the proper rules of design are set forth for the construction and arrangement of the constituent lenses of that lens unit. This produces great advantages of improving the compact form of the housing for the entire optical system, simplifying the structure of the operating mechanism, and reducing the load on the driving means, while still permitting the decentering aberrations to be maintained stable at a minimum throughout the entire shifting range. A variable magnification optical system having the image stabilizing function, which is corrected well for the decentering aberrations, is thus achieved.

Another embodiment of the invention is next described in which a lens sub-unit constituting part of the third lens unit is made to decenter when stabilizing the image.

Figure 15:
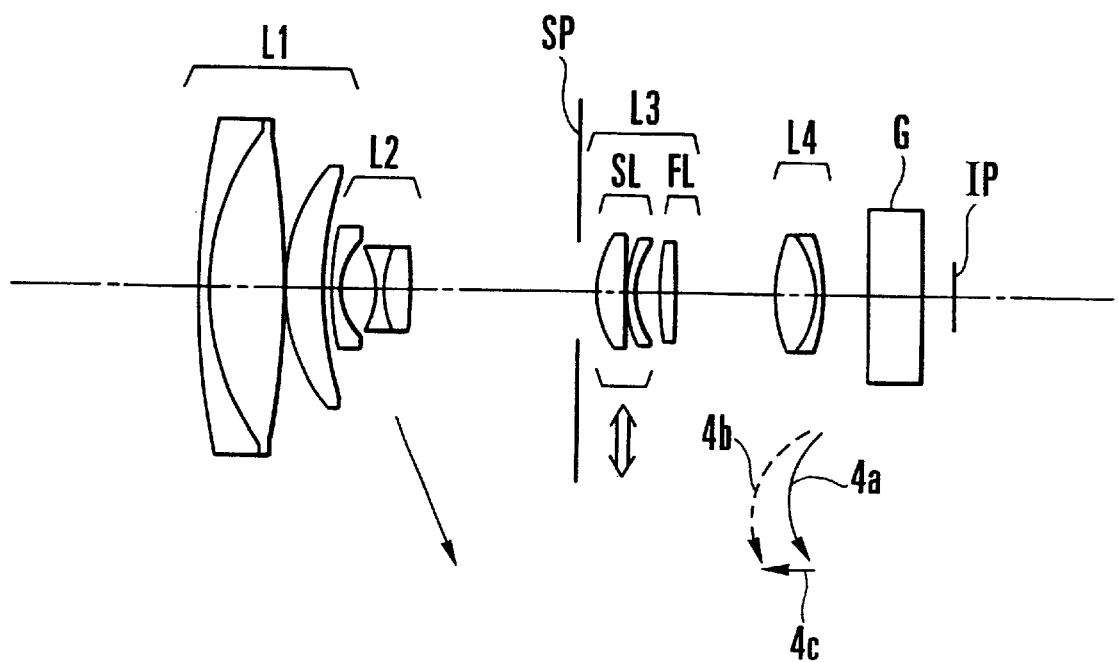
FIG. 15 is a lens block diagram of a numerical example 4 of the invention at the wide-angle end.
Figure 16:
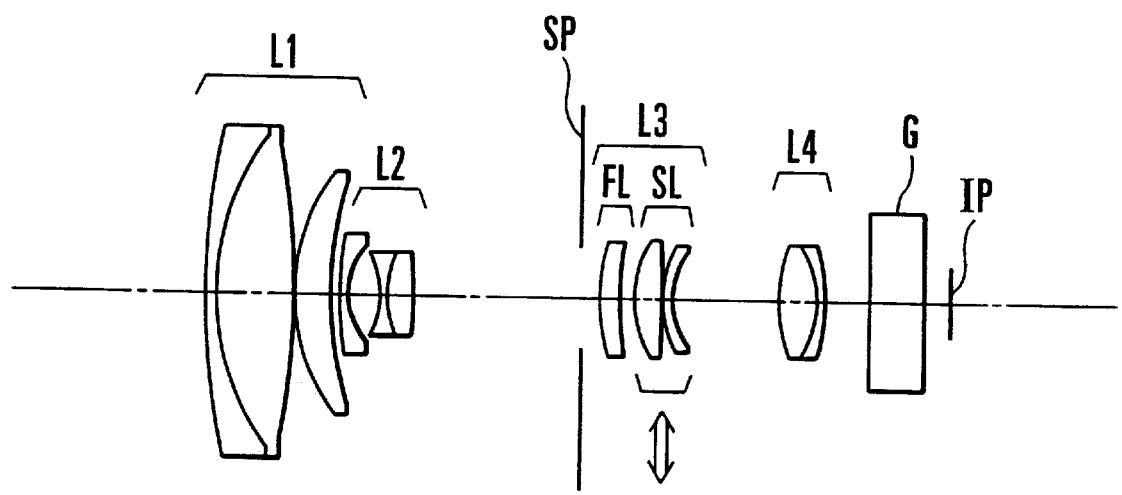
FIG. 16 is a lens block diagram of a numerical example 5 of the invention at the wide-angle end.
Figure 17:
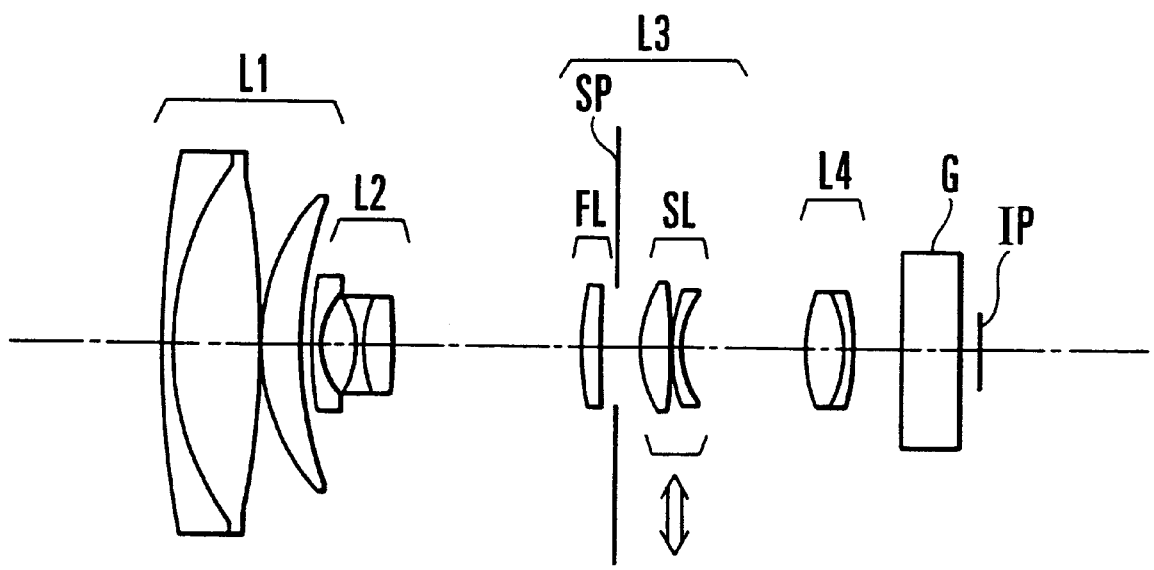
FIG. 17 is a lens block diagram of a numerical example 6 of the invention at the wide-angle end.
Figures 20A, 20B, 20C, 20D:
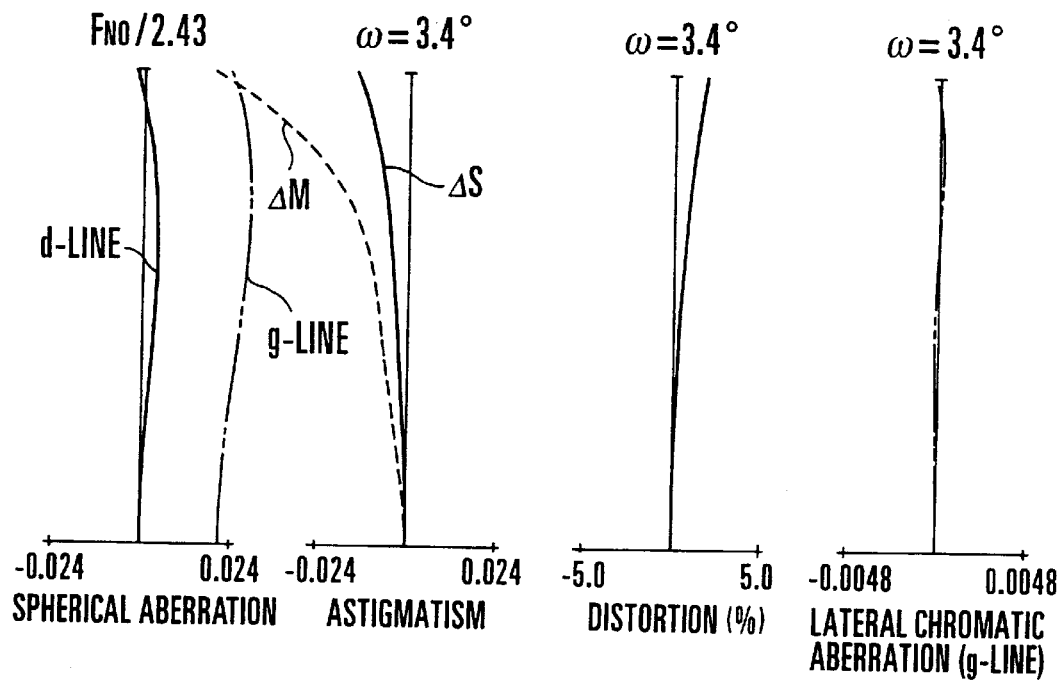
FIGS. 20A to 20D are graphic representations of the aberrations of the numerical example 4 of the invention at the telephoto end.
Figures 21A, 21B, 21C, 21D:
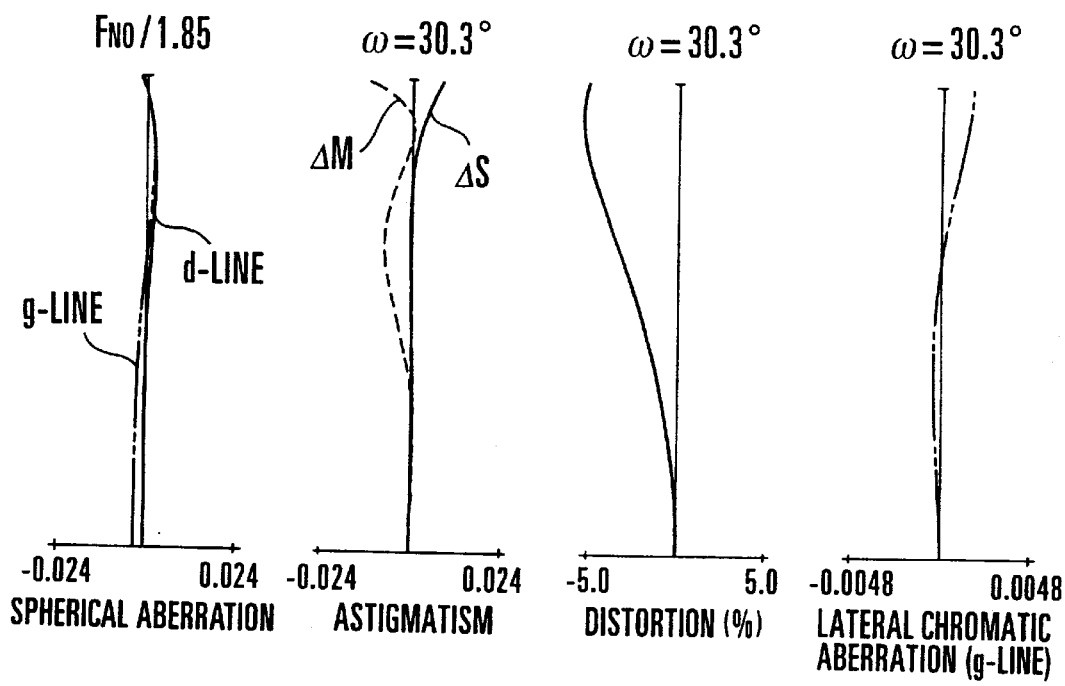
FIGS. 21A to 21D are graphic representations of the aberrations of the numerical example 5 of the invention at the wide-angle end.

FIGS. 15 to 17 are longitudinal section views of the numerical examples 4 to 6 of the invention at the wide-angle end, respectively.

In these figures, reference character L1 denotes a first lens unit of positive refractive power, reference character L2 denotes a second lens unit of negative refractive power, and reference character L3 denotes a third lens unit of positive refractive power, which has two lens sub-unit SL and FL of positive refractive power.

In the numerical examples 4 to 6, while the lens sub-unit FL is fixed, the lens sub-unit SL is made to move in a direction perpendicular to an optical axis to compensate for the shaking of an image on the focal plane when the variable magnification optical system vibrates (or tilts).

Reference character L4 denotes a fourth lens unit of positive refractive power. Reference character SP stands for an aperture stop positioned either in front of the third lens unit L3, or in a space between the lens sub-units FL and SL, reference character G stands for a glass block such as face plate, and reference character IP stands for an image plane.

In the present embodiment, during zooming from the wide-angle end to the telephoto end, as shown by the arrows, the second lens unit moves toward the image side, while simultaneously moving the fourth lens unit to compensate for the image shift with variation of the magnification.

Also, the rear focusing method is employed, as the fourth lens unit axially moves to effect focusing. In FIG. 15, a curved solid line 4*a* and a curved dashed line 4*b* show the loci of motion of the fourth lens unit to compensate for the image shift with zooming from the wide-angle end to the telephoto end when focused on an infinitely distant object and a close object, respectively. Incidentally, the first lens unit and the third lens unit remain stationary during zooming and during focusing.

In the present embodiment, the fourth lens unit axially moves to compensate for the image shift with zooming and also to effect focusing. In particular, as shown by the curved lines 4*a* and 4*b* in FIG. 1, the total zooming movement depicts a locus convex toward the object side. This assures efficient utilization of the space between the third lens unit and the fourth lens unit, thus achieving a much desired shortening of the total length of the optical system.

In the present embodiment, with the setting in, for example, the telephoto end, when focusing from an infinitely distant object to a close object, the fourth lens unit moves forward as shown by a straight line 4*c* in FIG. 15.

For the optical system in the present embodiment, a zoom type is employed in which the first and second lens units as a composite system form a virtual image that is focused to a real image on a photosensitive surface by the third and fourth lens units.

In the present embodiment, as compared with the conventional so-called 4-component zoom lens whose first component is movable for focusing, the effective diameter of the first lens unit is prevented from becoming larger, by employing the rear focusing method described above with an advantage of defending the performance against deterioration due to the error of axial alignment of the first lens unit.

Then, by putting the aperture stop either just in front of the third lens unit, or in between the lens sub-units FL and SL, the variation of aberrations of the movable lens units is lessened, and the axial separation between the lens units ahead of the aperture stop is shortened to facilitate reduction of the diameter of the front members of the first lens unit.

In the numerical examples 4 to 6 of the invention, the third lens unit L3 is composed of the two lens sub-units SL and FL of positive refractive power. Of these, the lens sub-unit SL is made to be movable in a direction perpendicular to the optical axis so as to correct the shaking of the image, as the variable magnification optical system vibrates. This obviates the necessity of using a novel optical member such as the lens unit specialized in stabilizing the image, or the variable angle prism in the prior art.

By the way, the 4-component type of zoom lens of plus-minus-plus-plus refractive power arrangement is common in the video cameras. With the use of this type, in order to decrease the decentering sensitivity of the third lens unit, a necessity arises to decrease the refractive power of the third lens unit, which is no longer suited to minimize the size of the optical system as a whole.

For this reason, according to the present invention, the third lens unit is divided into two lens sub-units SL and FL of positive refractive power. This allows the shift lens sub-unit SL to take a weaker refractive power. In turn, its decentering sensitivity is also made lower, thus achieving an optical system which reduces the inadequacy of correction for stabilizing the image due to the control tolerance of the operating mechanism.

Referring to FIG. 15, in the numerical example 4 of the invention, the third lens unit L3 comprises, in order from the object side to the image side, the lens sub-unit SL arranged to shift in the direction perpendicular to the optical axis in stabilizing the image and the fixed lens sub-unit FL. The lens sub-unit SL is constructed from a positive lens having a convex surface facing the object side, and a negative lens of meniscus form having a strong concave surface facing the image side, and the fixed lens sub-unit FL is constructed from a positive lens both surfaces of which are convex.

In addition, the lens sub-units SL and FL each are provided with at least one aspheric surface to decrease the residual aberrations of each lens sub-unit, thus preventing the optical performance from deteriorating when stabilizing the image.

In the numerical example 4, the asphere is introduced to the frontmost surface of each of the lens sub-units SL and FL to thereby minimize the spherical aberration and coma the lens sub-units produce. When stabilizing the image, the decentering aberrations, particularly coma, are thus corrected well. The position of the aspheric surface may differ with different lens sub-units.

To correct also the lateral chromatic aberration and field curvature due to the decentering, it is desirable to correct the shift lens sub-unit in itself for chromatic aberrations as well as possible and to reduce the Petzval sum likewise. Therefore, the shift lens sub-unit SL is better constructed with inclusion of at least one negative lens to produce advantages of correcting the chromatic aberrations and reducing the Petzval sum.

Referring to FIG. 16, in the numerical example 5 of the invention, the third lens unit comprises, in order from the object side to the image side, a fixed lens sub-unit FL and a lens sub-unit SL arranged to shift in the direction perpendicular to the optical axis in stabilizing the image. The fixed lens sub-unit FL is constructed from a positive lens of meniscus form, and the lens sub-unit SL is constructed from a positive lens both surfaces of which are convex and a negative lens of meniscus form having a strong concave surface facing the image side. An aspheric surface is introduced to the lens sub-unit SL at the frontmost side, thereby minimizing the spherical aberration and coma in the lens sub-unit SL. The decentering coma is thus prevented from being produced in stabilizing the image.

Also, in the numerical example 5, the negative lens is disposed at the rearmost position of the third lens unit to thereby bring the form of the whole third lens unit to the telephoto type. The shortening of the total length of the entire optical system is thus achieved.

Referring to FIG. 17, in the numerical example 6 of the invention, the third lens unit comprises, in order from the object side to the image side, a fixed lens sub-unit FL and a lens sub-unit SL arranged to shift in stabilizing the image, and the aperture stop SP is positioned in the space between the lens sub-units FL and SL to thereby lower the height at which the off-axial light ray passes through the lens sub-unit SL. The variation of field curvature and coma with stabilizing of the image is reduced to a minimum. The asphere is applied to the frontmost surface of each of the lens sub-units SL and FL to correct the various aberrations well.

The features described above, when satisfied, realize the variable magnification optical system having the image stabilizing function of the invention. To further improve the optical performance, while still maintaining the shortening of the total length of the optical system to be achieved, it is preferable to satisfy at least one of the following conditions.

(ii-1) The focal length fSL of the lens sub-unit SL lies in the following range:

$$1.3 < fSL/f3 < 2.0 \qquad (5)$$

where f3 is the focal length of the third lens unit.

The inequalities of condition (5) are concerned with the refractive power arrangement over the two lens sub-units constituting the third lens unit. When the refractive power of the lens sub-unit SL becomes greater than the lower limit of the condition (5), the decentering sensitivity is caused also to increase. As mentioned before, the inadequacy of correction for stabilizing the image due to the tolerance of the mechanisms is, therefore, caused to increase. Conversely when the refractive power of the lens sub-unit SL is smaller than the upper limit, the required amount of movement for stabilizing the image of the lens sub-unit SL becomes too large. The actuator or like member for driving the lens sub-unit SL becomes larger objectionably. (ii-2) The focal lengths f2 and f3 of the second and third lens units lie in the following ranges:

$$0.23 < |f2/\sqrt{fW \cdot fT}| < 0.35 \quad (6)$$

$$2.3 < f3/fW < 4.0 \quad (7)$$

where fW and fT are the focal lengths at the wide-angle end and the telephoto end of the entire optical system, respectively.

When the lower limit of the condition (6) is exceeded, as this means that the refractive power of the second lens unit is too strong, the total length of the optical system is easy to shorten, but it becomes objectionably difficult to correct the field curvature and distortion for good stability throughout the entire zooming range. When the refractive power of the second lens unit is too weak as exceeding the upper limit of the condition (6), the required movement for the given zoom ratio of the second lens unit increases unduly greatly.

When the refractive power of the third lens unit is stronger than the lower limit of the condition (7), it becomes easier to shorten the total length of the optical system, but the difficulty of securing the back focal distance increases objectionably. When the refractive power of the third lens unit is too weak as exceeding the upper limit of the condition (7), it becomes difficult to shorten the total length of the optical system. (ii-3) The frontmost convex surface of the lens sub-unit SL is formed to such an aspheric shape that the positive refractive power becomes progressively weaker as the distance from the center of the lens to the margin increases.

Next, the numerical examples 4 to 6 of the invention are shown with the numerical data in tables below, where Ri is the radius of curvature of the i-th lens surface when counted from the object side, Di is the i-th lens thickness or air separation when counted from the object side, and Ni and νi are respectively the refractive index and Abbe number of the glass of the i-th lens element when counted from the object side.

The values of the factors in the above-described conditions (5) to (7) for the numerical examples 4 to 6 are listed in Table-2.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1 + \sqrt{1 - (H/R)^2}} + AH^2 + BH^4 + CH^6 + DH^8 + EH^{10}$$

where R is the radius of the osculating sphere, and A, B, C, D and E are the aspheric coefficients. The values of the aspheric coefficients are also tabulated where the notation: "e–0X" means $10^{-X}$.

NUMERICAL EXAMPLE 4

| f = 1–9.75 | Fno = 1.85–2.43 | 2ω = 60.5°–6.8° | |
|---|---|---|---|
| R1 = 13.432 | D1 = 0.18 | N1 = 1.84666 | ν1 = 23.8 |
| R2 = 4.279 | D2 = 1.21 | N2 = 1.71299 | ν2 = 53.8 |
| R3 = –16.292 | D3 = 0.04 | | |
| R4 = 3.174 | D4 = 0.60 | N3 = 1.77249 | ν3 = 49.6 |
| R5 = 6.374 | D5 = Variable | | |
| R6 = 4.590 | D6 = 0.14 | N4 = 1.88299 | ν4 = 40.8 |
| R7 = 1.088 | D7 = 0.56 | | |
| R8 = –1.302 | D8 = 0.12 | N5 = 1.71700 | ν5 = 47.9 |
| R9 = 1.618 | D9 = 0.44 | N6 = 1.84666 | ν6 = 23.8 |
| R10 = –7.312 | D10 = Variable | | |
| R11 = Stop | D11 = 0.31 | | |
| *R12 = 1.614 | D12 = 0.45 | N7 = 1.58312 | ν7 = 59.4 |
| R13 = 23.575 | D13 = 0.02 | | |
| R14 = 2.006 | D14 = 0.14 | N8 = 1.84666 | ν8 = 23.8 |
| R15 = 1.372 | D15 = 0.43 | | |
| *R16 = 5.106 | D16 = 0.26 | N9 = 1.58312 | ν9 = 59.4 |
| R17 = –21.356 | D17 = Variable | | |
| *R18 = 2.762 | D18 = 0.64 | N10 = 1.58312 | ν10 = 59.4 |
| R19 = –1.484 | D19 = 0.12 | N11 = 1.84666 | ν11 = 23.8 |
| R20 = –2.909 | D20 = 0.71 | | |
| R21 = ∞ | D21 = 0.88 | N12 = 1.51633 | ν12 = 64.1 |
| R22 = ∞ | | | |

*Aspheric Surface

Aspheric Coefficients:

| R12: | K = –1.847e – 02 | B = –2.316e – 02 | C = 1.045e – 03 |
|---|---|---|---|
| | D = –4.875e – 03 | E = 0 | |
| R16: | K = 9.862e + 00 | B = –1.198e – 02 | C = –1.155e – 03 |
| | D = –2.915e – 03 | E = 5.173e – 0 | |
| R18: | K = –1.754e + 00 | B = 6.556e – 03 | C = –5.764e – 03 |
| | D = 1.252e – 02 | E = –3.690e – 03 | |

| Variable | Focal Length | | |
|---|---|---|---|
| Separation | 1.00 | 4.42 | 9.75 |
| D5 | 0.14 | 2.15 | 2.72 |
| D10 | 2.77 | 0.76 | 0.19 |
| D17 | 1.69 | 1.09 | 1.94 |

NUMERICAL EXAMPLE 5

| f = 1–9.75 | Fno = 1.85–2.43 | 2ω = 60.5°–6.8° | |
|---|---|---|---|
| R1 = 13.123 | D1 = 0.18 | N1 = 1.84666 | ν1 = 23.8 |
| R2 = 4.332 | D2 = 1.21 | N2 = 1.71299 | ν2 = 53.8 |
| R3 = –15.563 | D3 = 0.04 | | |
| R4 = 3.205 | D4 = 0.60 | N3 = 1.77249 | ν3 = 49.6 |
| R5 = 6.250 | D5 = Variable | | |
| R6 = 4.973 | D6 = 0.14 | N4 = 1.88299 | ν4 = 40.8 |
| R7 = 1.098 | D7 = 0.53 | | |
| R8 = –1.293 | D8 = 0.12 | N5 = 1.71700 | ν5 = 47.9 |
| R9 = 1.554 | D9 = 0.44 | N6 = 1.84666 | ν6 = 23.8 |
| R10 = –7.532 | D10 = Variable | | |
| R11 = Stop | D11 = 0.31 | | |
| *R12 = 2.768 | D12 = 0.33 | N7 = 1.66910 | ν7 = 55.4 |
| R13 = 4.909 | D13 = 0.24 | | |
| *R14 = 1.673 | D14 = 0.45 | N8 = 1.58312 | ν8 = 59.4 |
| R15 = –17.228 | D15 = 0.02 | | |
| R16 = 2.003 | D16 = 0.14 | N9 = 1.84666 | ν9 = 23.8 |
| R17 = 1.290 | D17 = Variable | | |
| *R18 = 2.427 | D18 = 0.64 | N10 = 1.58312 | ν10 = 59.4 |
| R19 = –1.533 | D19 = 0.12 | N11 = 1.84666 | ν11 = 23.8 |

-continued

| | | | |
|---|---|---|---|
| R20 = −3.220 | D20 = 0.71 | | |
| R21 = ∞ | D21 = 0.88 | N12 = 1.51633 | ν12 = 64.1 |
| R22 = ∞ | | | |

Aspheric Coefficients:

| | | | |
|---|---|---|---|
| R12: | K = −6.606e + 00 | B = 2.935e − 02 | C = −9.942e − 03 |
| | D = 3.892e − 04 | E = −2.100e − 03 | |
| R14: | K = −3.167e − 01 | B = −1.124e − 02 | C = −4.208e − 03 |
| | D = 2.283e − 03 | E = 0 | |
| R18: | K = −2.585e + 00 | B = 1.786e − 02 | C = −1.134e − 02 |
| | D = 1.482e − 02 | E = −2.606e − 03 | |

| Variable | Focal Length | | |
|---|---|---|---|
| Separation | 1.00 | 4.53 | 9.75 |
| D5 | 0.14 | 2.17 | 2.74 |
| D10 | 2.79 | 0.76 | 0.19 |
| D17 | 1.73 | 1.09 | 1.94 |

NUMERICAL EXAMPLE 6

| f = 1–9.75 | Fno = 1.85–2.25 | 2ω = 60.5°–6.8° | |
|---|---|---|---|
| R1 = 13.453 | D1 = 0.18 | N1 = 1.84666 | ν1 = 23.8 |
| R2 = 4.446 | D2 = 1.29 | N2 = 1.69679 | ν2 = 55.5 |
| R3 = −13.988 | D3 = 0.04 | | |
| R4 = 3.223 | D4 = 0.60 | N3 = 1.77249 | ν3 = 49.6 |
| R5 = 6.152 | D5 = Variable | | |
| R6 = 5.790 | D6 = 0.14 | N4 = 1.88299 | ν4 = 40.8 |
| R7 = 1.116 | D7 = 0.53 | | |
| R8 = −1.274 | D8 = 0.12 | N5 = 1.69350 | ν5 = 53.2 |
| R9 = 1.679 | D9 = 0.44 | N6 = 1.84666 | ν6 = 23.8 |
| R10 = −8.414 | D10 = Variable | | |
| *R11 = 3.966 | D11 = 0.29 | N7 = 1.66910 | ν7 = 55.4 |
| R12 = 23.810 | D12 = 0.24 | | |
| R13 = Stop | D13 = 0.33 | | |
| *R14 = 1.637 | D14 = 0.45 | N8 = 1.58312 | ν8 = 59.4 |
| R15 = −14.062 | D15 = 0.02 | | |
| R16 = 2.342 | D16 = 0.14 | N9 = 1.84666 | ν9 = 23.8 |
| R17 = 1.365 | D17 = Variable | | |
| *R18 = 2.331 | D18 = 0.60 | N10 = 1.58312 | ν10 = 59.4 |
| R19 = −1.690 | D19 = 0.12 | N11 = 1.84666 | ν11 = 23.8 |
| R20 = −3.598 | D20 = 0.71 | | |
| R21 = ∞ | D21 = 0.88 | N12 = 1.51633 | ν12 = 64.1 |
| R22 = ∞ | | | |

Aspheric Coefficients:

| | | | |
|---|---|---|---|
| R11: | K = −1.316e + 01 | B = 2.207e − 02 | C = −9.331e − 03 |
| | D = −1.570e − 03 | E = 2.801e − 03 | |
| R14: | K = −4.979e − 01 | B = −1.037e − 02 | C = 1.652e − 04 |
| | D = 5.116e − 04 | E = 0 | |
| R18: | K = −1.937e + 00 | B = 1.339e − 02 | C = −1.140e − 02 |
| | D = 1.230e − 02 | E = −2.217e − 04 | |

| Variable | Focal Length | | |
|---|---|---|---|
| Separation | 1.00 | 4.52 | 9.75 |
| D5 | 0.15 | 2.22 | 2.80 |
| D10 | 2.85 | 0.78 | 0.19 |
| D17 | 1.86 | 1.11 | 1.89 |

TABLE 2

| | | Numerical Example | | |
|---|---|---|---|---|
| | Condition | 4 | 5 | 6 |
| (5) | fSL/f3 | 1.523 | 1.517 | 1.684 |
| (6) | |f2/√(fW·fT)| | 0.312 | 0.309 | 0.306 |
| (7) | f3/fW | 3.284 | 3.150 | 3.002 |

It will be appreciated from the foregoing that, according to the invention, as applied to the variable magnification optical system in which a lens unit of relatively small size and light weight moves in the direction perpendicular to the optical axis to compensate for the shaking of the image as the variable magnification optical system vibrates (tilts), the proper rules of design are set forth for the construction and arrangement of the constituent lenses of that lens unit. This produces great advantages of improving the compact form of the entire optical system, simplifying the structure of the operating mechanism, and reducing the load on the driving means, while still permitting the decentering aberrations to be maintained stable at a minimum throughout the entire shifting range. A variable magnification optical system having the image stabilizing function which is corrected well for the decentering aberrations is thus achieved.

By the way, in recent years, even for the video camera for home use to improve the image quality, the 3-CCD model is employed in some cases. However, if, as the variable magnification optical system with four lens units of positive, negative, positive and positive refractive powers is adapted to the 3-CCD model, its third lens unit is made movable as a whole in a direction perpendicular to the optical axis to compensate for the shaking of the image , the sensitivity for correction of the optical axis of the third lens unit for image stabilization becomes too much small. In turn, the amount of movement of the third lens unit as the compensating lens unit becomes too much large. Accordingly, there is a problem that the entire optical system increases in diameter unduly greatly.

An embodiment to describe below is concerned with an image-stabilizing variable magnification optical system which has further promoted the compactness of the optical system.

Figure 27:
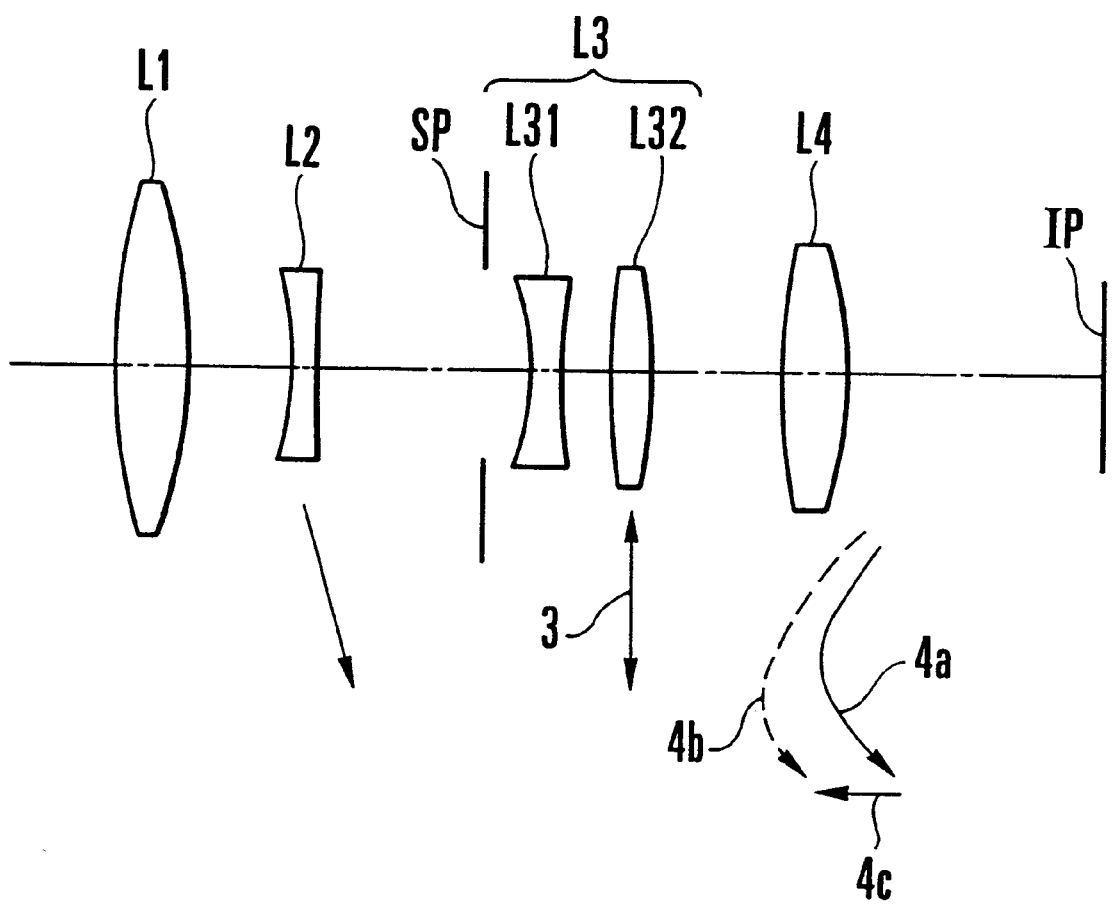
FIG. 27 is a schematic diagram of the paraxial refractive power arrangement of a variable magnification optical system according to another embodiment of the invention, which corresponds to numerical examples 7 to 9.
Figure 28:
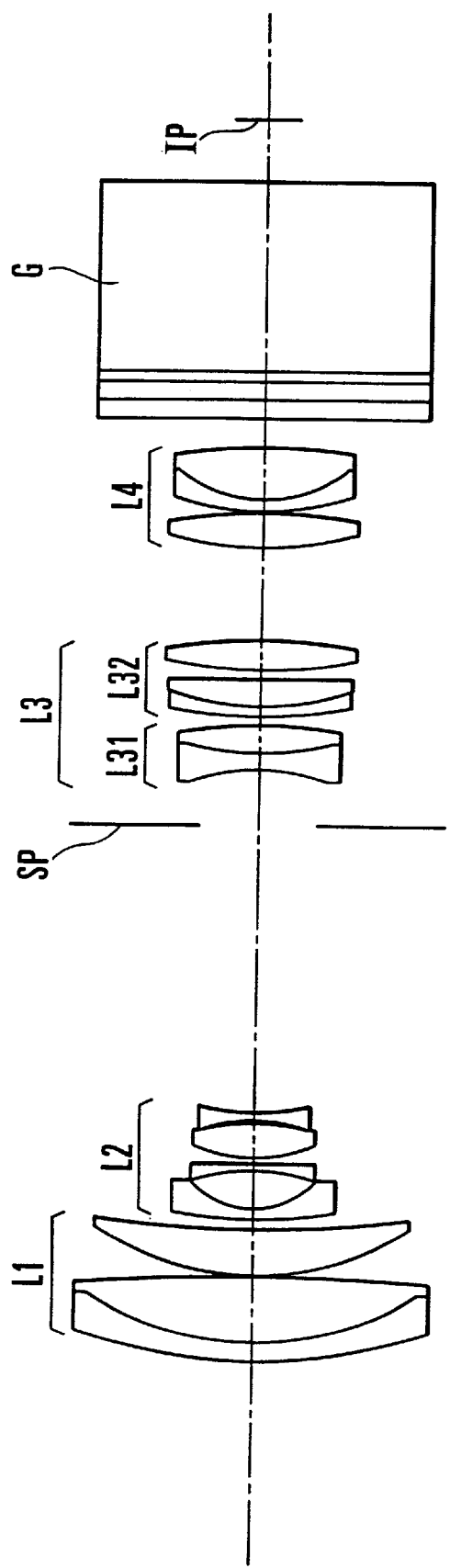
FIG. 28 is a lens block diagram of the numerical example 7 at the wide-angle end.
Figure 29:
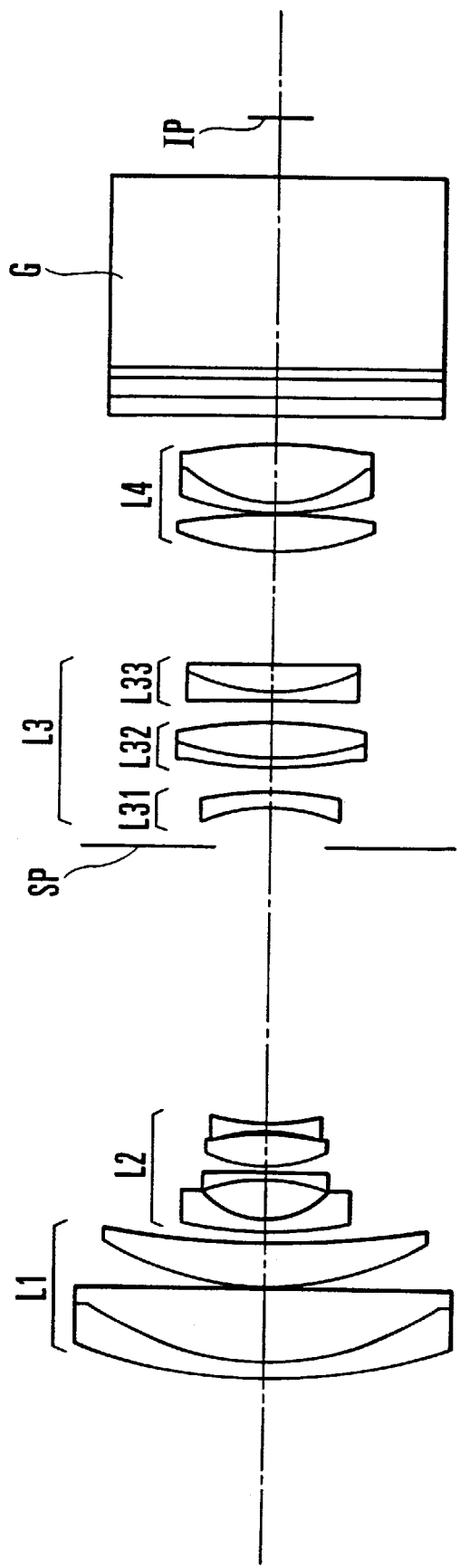
FIG. 29 is a lens block diagram of the numerical example 8 at the wide-angle end.
Figure 30:
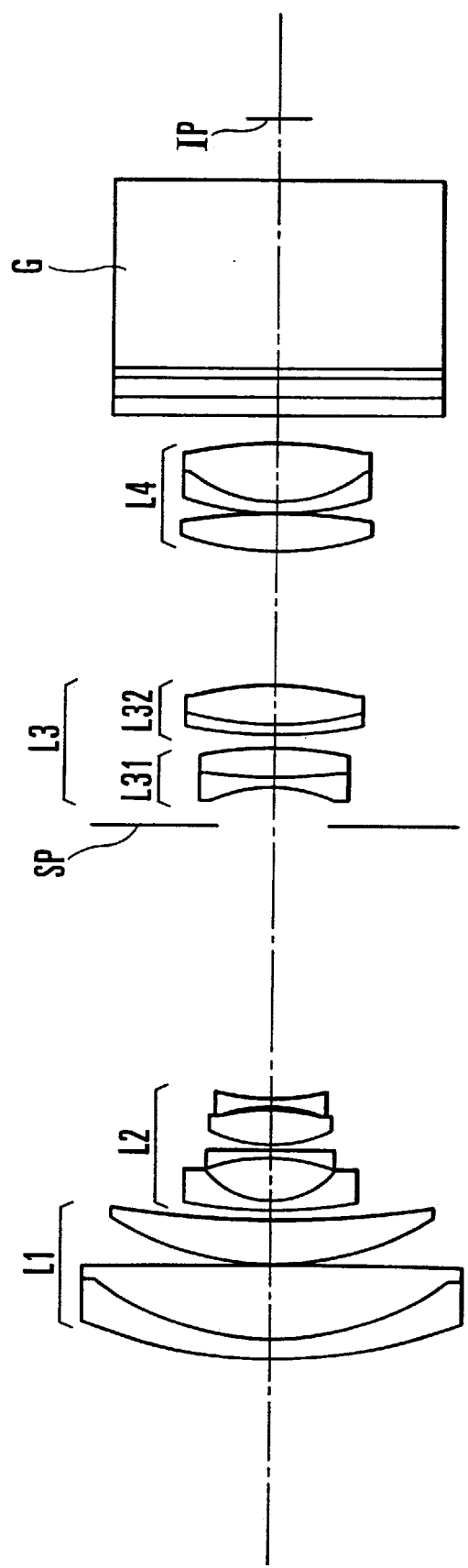
FIG. 30 is a lens block diagram of the numerical example 9 at the wide-angle end.
Figures 33A, 33B, 33C, 33D:
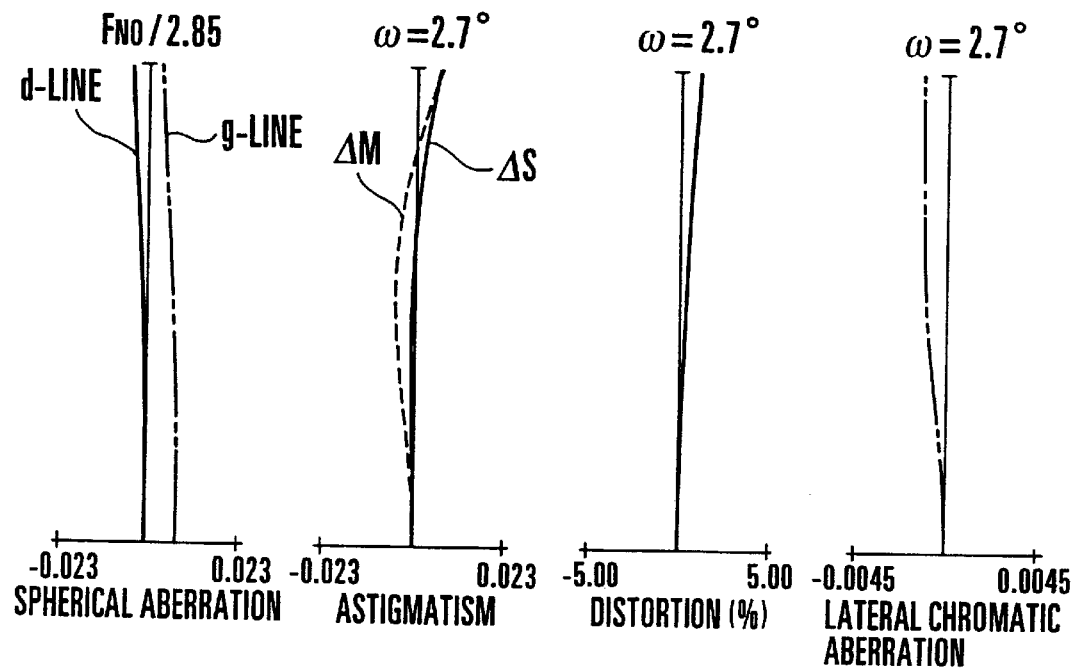
FIGS. 33A to 33D are graphic representations of the various aberrations of the numerical example 7 at the telephoto end.
Figures 34A, 34B, 34C, 34D:
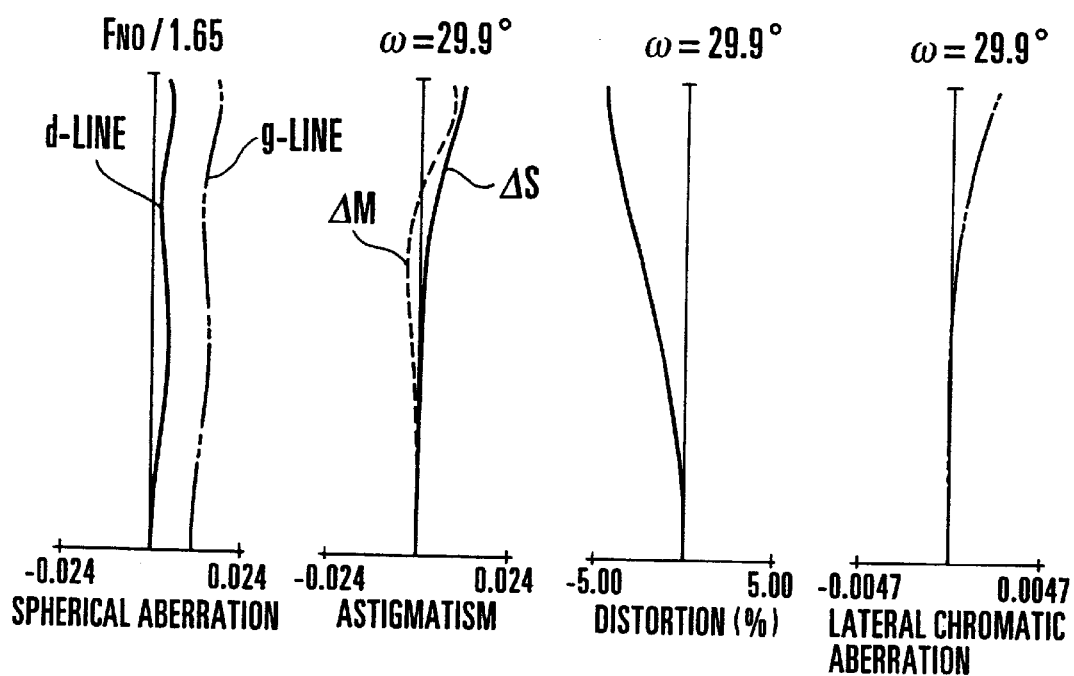
FIGS. 34A to 34D are graphic representations of the various aberrations of the numerical example 8 at the wide-angle end.
Figures 35A, 35B, 35C, 35D:
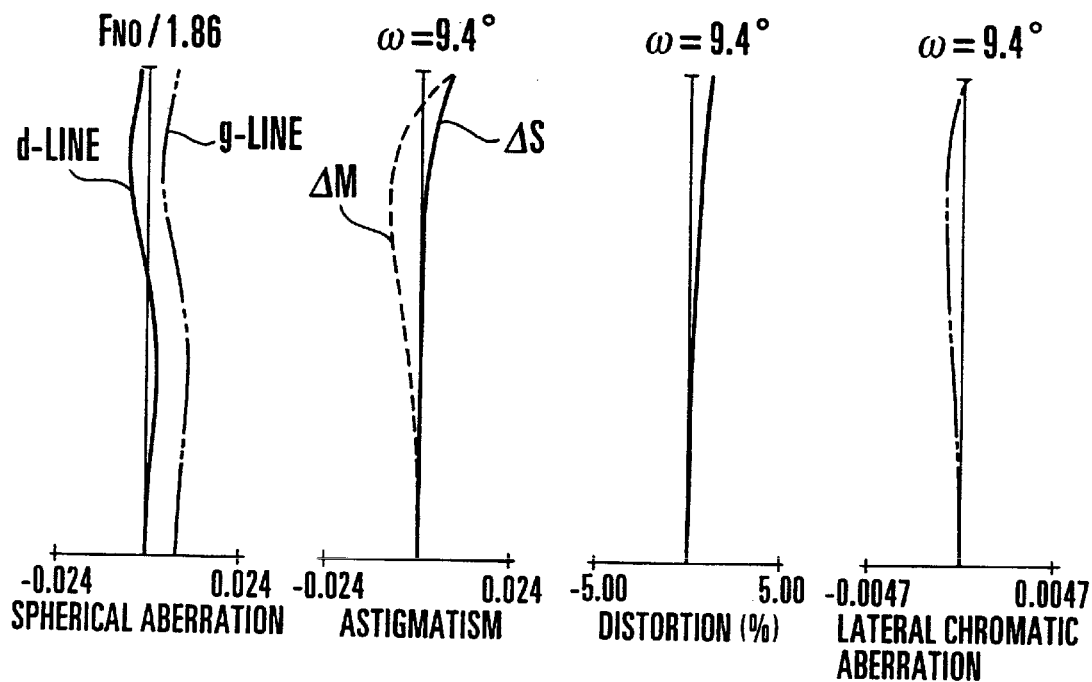
FIGS. 35A to 35D are graphic representations of the various aberrations of the numerical example 8 in a middle focal length position.
Figures 36A, 36B, 36C, 36D:
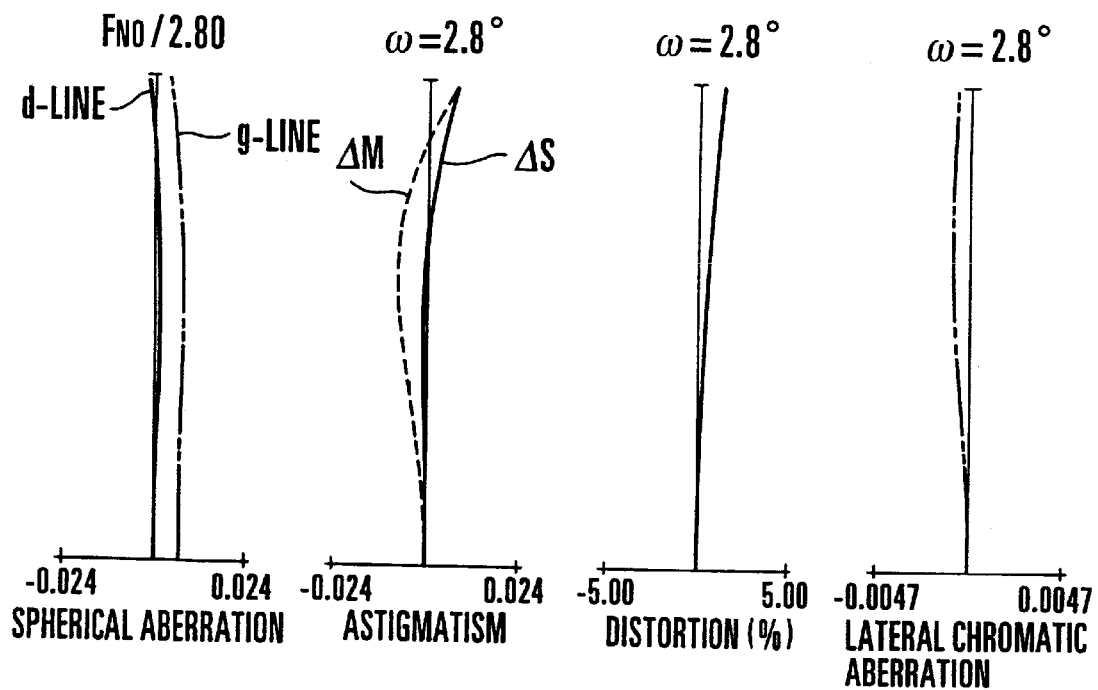
FIGS. 36A to 36D are graphic representations of the various aberrations of the numerical example 8 at the telephoto end.
Figures 37A, 37B, 37C, 37D:
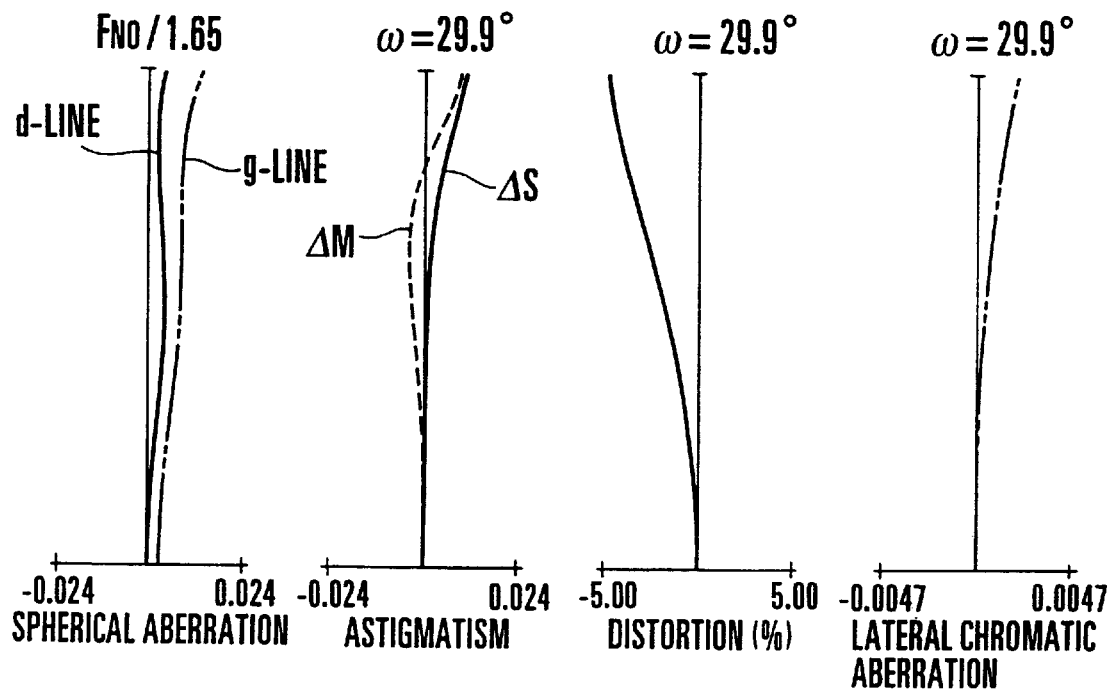
FIGS. 37A to 37D are graphic representations of the various aberrations of the numerical example 9 at the wide-angle end.
Figures 38A, 38B, 38C, 38D:
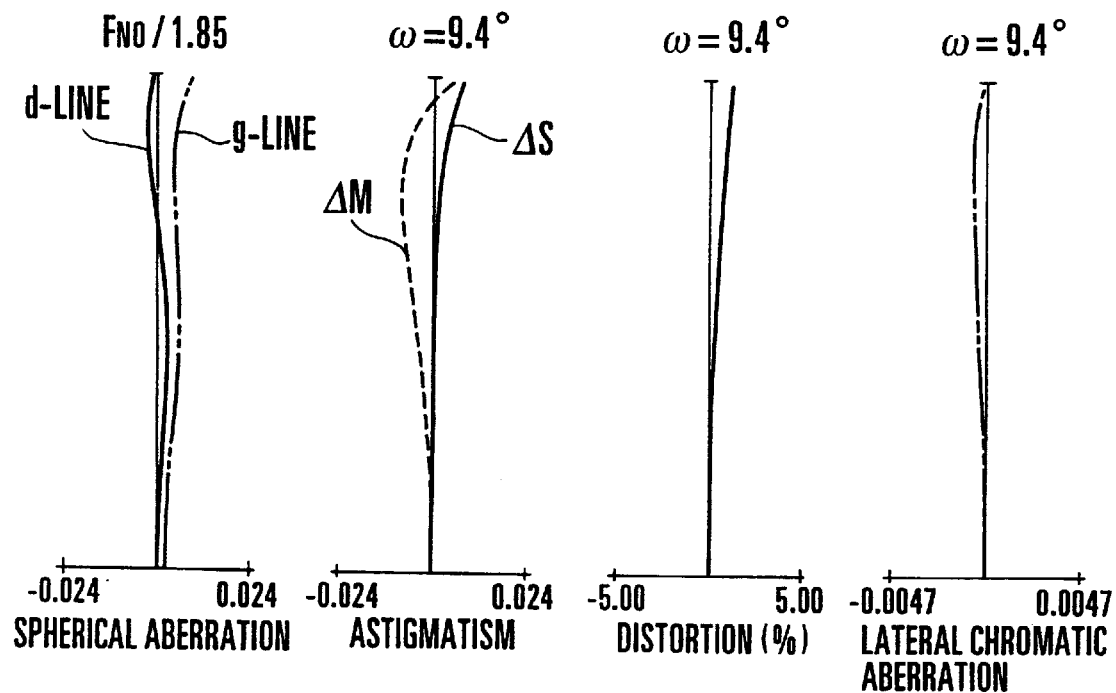
FIGS. 38A to 38D are graphic representations of the various aberrations of the numerical example 9 in a middle focal length position.

FIG. 27 schematically shows the paraxial refractive power arrangement of the present embodiment. FIGS. 28 to 30 are the lens block diagrams of numerical examples 7 to 9 at the wide-angle end, respectively.

In FIGS. 27 to 30, reference character L1 denotes a first lens unit of positive refractive power, reference character L2 denotes a second lens unit of negative refractive power, and reference character L3 denotes a third lens unit of positive refractive power.

The third lens unit L3 has at least two lens sub-units, i.e., a first lens sub-unit L31 of negative refractive power and a second lens sub-unit L32 of positive refractive power.

In the numerical examples 7 to 9, the second lens sub-unit L32 is made to move in a direction perpendicular to an optical axis, as indicated by the arrow 3, to compensate for the shaking of an image on the focal plane as the variable magnification optical system vibrates (tilts).

Reference character L4 denotes a fourth lens unit of positive refractive power. Reference character SP denotes an aperture stop disposed either in front of the third lens unit L3, or in the interior of the third lens unit L3, or in a space between the third and fourth lens units L3 and L4. Reference character G denotes a glass block such as phase plate. Reference character IP denotes an image plane.

As shown in FIG. 27, in the present embodiment, during zooming from the wide-angle end to the telephoto end, the second lens unit L2 is moved toward the image side as indicated by the arrow, while the fourth lens unit L4 is simultaneously moved to compensate for the image shift with zooming.

Also, focusing is performed by axially moving the fourth lens unit L4. That is, the rear focusing method is employed. A curved solid line 4a and a curved dashed line 4b in FIG. 27 represent the loci of motion of the fourth lens unit L4 to compensate for the image shift with zooming from the wide-angle end to the telephoto end when focusing on an infinitely distant object and an object at the minimum distance, respectively. Incidentally, the first and third lens units L1 and L3 remain stationary during zooming and during focusing.

In the present embodiment, the compensating provision for the image shift with zooming and the focusing provision both are made in the fourth lens unit L4. In particular, the total zooming movement of the fourth lens unit L4 is made to depict a locus convex toward the object side, as shown by the curved lines 4a and 4b in FIG. 27. This assures efficient utilization of the space between the third and fourth lens units L3 and L4, thus achieving a shortening of the total length of the entire optical system.

In the present embodiment, with the setting in, for example, the telephoto end, focusing from an infinitely distant object to a close object is performed by moving the fourth lens unit L4 forward as shown by a straight line 4c in FIG. 27.

The zoom lens in the present embodiment takes a zoom type in which the composite system of the first and second lens units L1 and L2 forms a virtual image, which is focused to a real image on a photosensitive surface by the third and fourth lens units L3 and L4.

In the present embodiment, as compared with the conventional so-called 4-component zoom lens in which the first component is moved forward to effect focusing, the diameter of the first lens unit is advantageously prevented from becoming larger by employing the rear focusing method described above, while keeping the performance against deterioration due to the error of axial alignment of the first lens unit.

In addition, the aperture stop SP is disposed either just in front of the third lens unit L3, or in the interior of the third lens unit L3, or in the space between the third and fourth lens units L3 and L4. This leads to a reduction in the variation of aberrations due to the moving lens units. As the axial separations between any adjacent two of the lens members which lie before the aperture stop SP are shortened, the shortening of the diameter of the front members is made easier to achieve.

In the numerical examples 7 and 9 shown in FIGS. 28 and 30, the third lens unit L3 is constructed with two lens sub-units, the first of which is a first lens sub-unit L31 of negative refractive power and the second of which is a second lens sub-unit L32 of positive refractive power. In the numerical example 8 shown in FIG. 29, the third lens unit L3 is constructed with three lens sub-units, the first of which is a first lens sub-unit L31 of negative refractive power, the second of which is a second lens sub-unit L32 of positive refractive power and the third is a third lens sub-unit L33 of positive refractive power.

Incidentally, in the present embodiment, the third lens unit L3 may be constructed with four or more lens sub-units. Then, the second lens sub-unit in the third lens unit L3 is used for stabilizing the image. When the variable magnification optical system vibrates, the second lens sub-unit is moved in the direction perpendicular to the optical axis so as to compensate for the image shaking. The image stabilization is thus achieved without having to use any additional optical element such as a unit of mating lenses, or a variable angle prism which is required in the conventional image stabilizing optical systems.

Here, in the photographic lens for the video camera assigned to the 3-CCD model, there is need to create a space the prism for color separation occupies. Therefore, the back focal distance must be made longer than that for the photographic lens for the single plate model. For this reason, the positive refractive power of the third lens unit becomes weak as compared with the positive refractive power of the fourth lens unit. Therefore, the third lens unit has a small sensitivity in the direction perpendicular to the optical axis.

Therefore, if the third lens unit is made to move as a whole in a direction perpendicular to the optical axis to stabilize the image, the amount of movement of the third lens unit becomes too much larger. Supposing that the 4-unit form of zoom lens, which is now common in practice, is used in the photographic lens for the video camera and the decentering sensitivity of the third lens unit is to increase, then a necessity arises in that the refractive power of the third lens unit is increased. This results in a difficulty of securing the back focal distance long enough. Hence, it is not suited to the 3-CCD model.

Therefore, in the present embodiment, the third lens unit L3 is divided into at least two lens sub-units, i.e., the first lens sub-unit L31 of negative refractive power and the second lens sub-unit L32 of positive refractive power. By using the second lens sub-unit L32 as the shift lens, increasing the refractive power of the second lens sub-unit L32 and, therefore, increasing its decentering sensitivity, too, an image-stabilizing optical system, although being adapted to the 3-CCD model, is achieved in an improved compact form.

The present embodiment has, despite the use of the image stabilizing function, to achieve improvements of the compact form, so that it provides such an arrangement and construction of the constituent parts of the variable magnification optical system. In this connection, it is preferred to satisfy the following conditions:

$$8 < f3/fW < 25 \tag{8}$$

$$0.3 < |f32/f3| < 0.75 \tag{9}$$

where f3 is the focal length of the third lens unit L3, fW is the focal length at the wide-angle end of the entire optical system, and f32 is the focal length of the second lens sub-unit L32.

The inequalities of conditions (8) and (9), in view of the 4-unit zoom lens of the configuration described above, give proper ranges for the focal lengths (refractive powers) of the third lens unit L3 and the second lens sub-unit L32 and have an aim chiefly to increase the sensitivity of the shift lens, while securing the sufficiently long back focal distance.

When the lower limit of the condition (8) is exceeded, as this means that the refractive power of the third lens unit L3 is too strong, although it is advantageous at shortening the total length of the entire optical system, the desired back focal distance becomes difficult to secure. When the refractive power of the third lens unit L3 is too weak over the upper limit of the condition (8), it becomes difficult to shorten the total length of the entire optical system.

The condition (9) is concerned with the refractive power distribution over the first and second lens sub-units of the third lens unit L3. When the proportion of the refractive power of the second lens sub-unit increases over the lower limit of the condition (9), the decentering sensitivity increases rapidly, causing the mechanical tolerance to affect the image stabilization with the result of a large compensation residual. Conversely, when the refractive power of the second lens sub-unit is weaker beyond the upper limit, the required movement for the equivalent compensation of the second lens sub-unit becomes too much large. To drive the second lens sub-unit, the actuator or like drive device, too, has to increase in size objectionably.

It is also preferred that, for the wide-angle end, the back focal distance bfw (the length of the optical path from the last lens surface to the image plane) falls in the following range:

$$3 < bfw/fW < 6 \tag{10}$$

By satisfying the condition (10), the zoom lens is made well adapted to the 3-CCD model of video camera.

When the back focal distance is shorter beyond the lower limit of the condition (10), there is no space for the color separation prism to insert therein. Conversely, when the upper limit is exceeded in order to insure an increase of the back focal distance, the first lens sub-unit has to take too strong a refractive power. So, it becomes difficult to keep the optical performance when the optical system is switched to the image stabilization mode by shifting the second lens sub-unit.

It is also preferred that the focal length f2 of the second lens unit L2 lies within the following range:

$$0.3 < |f2/\sqrt{fW \cdot fT}| < 0.5 \tag{11}$$

where fT is the focal length in the telephoto end of the entire optical system.

By satisfying the condition (11), a further shortening of the total length of the entire optical system can be assured.

When the lower limit of the condition (11) is exceeded, as this means that the refractive power of the second lens unit L2 is too strong, although it is advantageous at shorting the total length of the entire optical system, the difficulty of correcting the variation of field curvature and distortion over the entire zooming range increases objectionably. When the refractive power of the second lens unit L2 is too weak as exceeding the upper limit of the condition (11), the required movement for the entire zooming range of the second lens unit L2 increases objectionably.

Also, in the present embodiment, to sufficiently correct chromatic aberrations throughout the entire zooming range, it is preferred to construct the second lens unit L2 as comprising, in order from the object side, a negative lens of meniscus form concave toward the image side, a negative lens of bi-concave form, a positive lens and a negative lens. Also, as the back focal distance increases in adaptation to the 3-CCD model, the refractive power of the fourth lens unit L4 increases and, at the same time, the height at which the axial beam passes through the fourth lens unit L4 increases to increase the possibility of production of spherical aberrations. It is, therefore, desired to construct the fourth lens unit L4 with at least one negative lens and two positive lenses and with inclusion of at least one aspheric surface.

Referring to FIG. 28, the numerical example 7 is explained, where the third lens unit L3 comprises, in order from the object side, a fixed first lens sub-unit of negative refractive power and a second lens sub-unit of positive refractive power which shifts in a direction perpendicular to the optical axis in order to compensate for the image shaking. The first lens sub-unit is constructed with a negative lens of bi-concave form and a positive lens. The second lens sub-unit is constructed with a negative lens of meniscus form concave toward the image side and two positive lenses of bi-convex form.

Further, the first and second lens sub-units each are provided with at least one aspheric surface to thereby reduce the various aberrations of the respective individual sub-units to a minimum. The optical performance is thus kept stable against switching to the image stabilization mode.

In the numerical example 7, the aspheric surface is introduced to the frontmost surface in the first lens sub-unit and to the rearmost surface in the second lens sub-unit, so that each sub-unit produces smaller spherical aberration and coma. When stabilizing the image, the decentering aberrations, particularly coma, are corrected well.

Incidentally, any one of the other surfaces in each lens sub-unit may be made aspherical. Also, to correct decentering lateral chromatic aberration and curvature of field, it is desired that the shift lens itself is as well corrected for chromatic aberrations as possible and its Petzval sum is made as small as possible.

Therefore, the inclusion of at least one negative lens in the shift lens (second lens sub-unit) is advantageous at facilitating the correction of chromatic aberrations and the minimization of the Petzval sum. Also, if this measure is to take, the entire optical system has to keep good the chromatic aberrations. For this purpose, it is preferred that, besides the second lens sub-unit, the third lens unit is included with at least one positive lens.

Referring next to FIG. 29, the numerical example 8 is explained. The third lens unit L3 comprises, in order from the object side, a fixed first lens sub-unit of negative refractive power, a second lens sub-unit of positive refractive power, which shifts in a direction perpendicular to the optical axis in order to stabilize the image, and a third lens sub-unit of weak refractive power (its focal length being not less than five times as large as the focal length f3 of the third lens unit).

The first lens sub-unit is constructed with one negative lens, the second lens sub-unit is constructed with a negative lens and a positive lens of bi-convex form, and the third lens unit is constructed with a cemented lens composed of a negative lens and a positive lens. An aspheric surface is introduced to the second lens sub-unit at the rearmost surface to reduce the spherical aberration and coma in itself. With this aspheric surface, when stabilizing the image, decentering coma is produced at a minimum.

In the numerical example 8, the third lens sub-unit is made to have a weak refractive power relative to the overall one. Accordingly, the third lens unit is corrected as a whole for chromatic aberrations, and, at the same time, the influence of the position error of the third lens sub-unit is minimized.

Referring next to FIG. 30, the numerical example 9 is explained. The third lens unit L3 comprises, in order from the object side, a fixed first lens sub-unit of negative refractive power and a second lens sub-unit of positive refractive power which shifts in the direction perpendicular to the optical axis in order to stabilize the image. The first lens sub-unit is constructed with a negative lens of bi-concave form and a positive lens of bi-convex form. The second lens sub-unit is constructed with a negative lens of meniscus form convex toward the object side and a positive lens of bi-convex form.

The front surface of the first lens sub-unit and the rear surface of the second lens sub-unit are made aspherical to prevent the optical performance from lowering when stabilizing the image.

Next, the numerical examples 7 to 9 are shown with the numerical data in tables below, where Ri is the radius of curvature of the i-th surface when counted from the object side, Di is the i-th lens thickness or air separation when counted from the object side, and Ni and vi are respectively the refractive index and Abbe number of the material of the i-th lens element when counted from the object side. Also, R29 to R33 in the numerical example 7, R28 to R32 in the numerical example 8 and R26 to R30 in the numerical example 9 each represent an optical filter, a phase plate and others, but these can be omitted according to the needs.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1 + \sqrt{1 - (1+K)(H/R)^2}} + AH^2 + BH^4 + CH^6 + DH^8 + EH^{10}$$

where R is the radius of the osculating sphere, and K, A, B, C, D and E are the aspheric coefficients. The values of the aspheric coefficients are also tabulated where the notation: "e-0X" means $10^{-x}$.

The values of the factors in the above-described conditions (8) to (11) for the numerical examples 7 to 9 are listed in Table-3.

NUMERICAL EXAMPLE 7

| f = 1~11.82 | Fno = 1.66~2.85 | 2ω = 58.4°~5.4° | |
|---|---|---|---|
| R1 = 9.925 | D1 = 0.29 | N1 = 1.846660 | v1 = 23.8 |
| R2 = 5.595 | D2 = 1.12 | N2 = 1.487490 | v2 = 70.2 |
| R3 = −43.779 | D3 = 0.04 | | |
| R4 = 5.260 | D4 = 0.75 | N3 = 1.696797 | v3 = 55.5 |
| R5 = 19.736 | D5 = Variable | | |
| R6 = 8.248 | D6 = 0.18 | N4 = 1.882997 | v4 = 40.8 |
| R7 = 1.490 | D7 = 0.64 | | |
| R8 = −3.502 | D8 = 0.14 | N5 = 1.834807 | v5 = 42.7 |
| R9 = −108.997 | D9 = 0.10 | | |
| R10 = 2.620 | D10 = 0.58 | N6 = 1.846660 | v6 = 23.8 |
| R11 = −4.432 | D11 = 0.05 | | |
| R12 = −3.132 | D12 = 0.14 | N7 = 1.804000 | v7 = 46.6 |
| R13 = 4.496 | D13 = Variable | | |
| R14 = Stop | D14 = 0.96 | | |
| *R15 = −3.797 | D15 = 0.27 | N8 = 1.677900 | v8 = 55.3 |
| R16 = 5.698 | D16 = 0.48 | N9 = 1.761821 | v9 = 26.5 |
| R17 = −8.672 | D17 = 0.16 | | |
| R18 = 9.112 | D18 = 0.17 | N10 = 1.846660 | v10 = 23.8 |
| R19 = 4.683 | D19 = 0.02 | | |
| R20 = 5.105 | D20 = 0.43 | N11 = 1.487490 | v11 = 70.2 |
| R21 = −1309.349 | D21 = 0.16 | | |
| R22 = 8.305 | D22 = 0.50 | N12 = 1.589130 | v12 = 61.2 |
| *R23 = −9.804 | D23 = Variable | | |
| *R24 = 5.880 | D24 = 0.59 | N13 = 1.583126 | v13 = 59.4 |
| R25 = −10.117 | D25 = 0.05 | | |
| R26 = 5.327 | D26 = 0.18 | N14 = 1.846660 | v14 = 23.8 |
| R27 = 2.419 | D27 = 0.89 | N15 = 1.487490 | v15 = 70.2 |
| R28 = −9.512 | D28 = 0.46 | | |
| R29 = ∞ | D29 = 0.32 | N16 = 1.516330 | v16 = 64.2 |
| R30 = ∞ | D30 = 0.32 | N17 = 1.552320 | v17 = 63.4 |
| R31 = ∞ | D31 = 0.17 | N18 = 1.556710 | v18 = 58.6 |
| R32 = ∞ | D32 = 3.19 | N19 = 1.589130 | v19 = 61.2 |
| R33 = ∞ | | | |

*Aspheric Surface

| Variable | Focal Length | | |
|---|---|---|---|
| Separation | 1.00 | 5.26 | 11.82 |
| D 5 | 0.18 | 3.71 | 4.71 |
| D13 | 4.87 | 1.34 | 0.34 |
| D23 | 1.57 | 0.83 | 1.57 |

Aspheric Coefficients:

| R15: | K = −8.37349e − 01 | B = −4.62595e − 03 | C = −9.58087e − 04 |
| | D = 3.38343e − 05 | E = 0.00000e + 00 | |
| R23: | K = 1.56127e + 01 | B = 2.87554e − 03 | C = 1.34138e − 04 |
| | D = 5.55133e − 05 | E = 0.00000e + 00 | |

-continued

| R24: | K = 2.53420e − 01 | B = −2.12625e − 03 | C = 1.63471e − 04 |
| | D = −1.34379e − 05 | E = 0.00000e + 00 | |

NUMERICAL EXAMPLE 8

| f = 1~11.79 | Fno = 1.65~2.80 | 2ω = 59.9°~5.6° | |
|---|---|---|---|
| R1 = 10.374 | D1 = 0.32 | N1 = 1.846660 | v1 = 23.8 |
| R2 = 5.695 | D2 = 1.27 | N2 = 1.603112 | v2 = 60.6 |
| R3 = −180.598 | D3 = 0.04 | | |
| R4 = 5.778 | D4 = 0.78 | N3 = 1.696797 | v3 = 55.5 |
| R5 = 19.516 | D5 = Variable | | |
| R6 = 8.548 | D6 = 0.19 | N4 = 1.882997 | v4 = 40.8 |
| R7 = 1.552 | D7 = 0.70 | | |
| R8 = −3.274 | D8 = 0.14 | N5 = 1.834807 | v5 = 42.7 |
| R9 = −29.337 | D9 = 0.11 | | |
| R10 = 2.610 | D10 = 0.58 | N6 = 1.846660 | v6 = 23.8 |
| R11 = −5.401 | D11 = 0.05 | | |
| R12 = −3.527 | D12 = 0.14 | N7 = 1.772499 | v7 = 49.6 |
| R13 = 3.752 | D13 = Variable | | |
| R14 = Stop | D14 = 0.71 | | |
| *R15 = −3.173 | D15 = 0.28 | N8 = 1.677900 | v8 = 55.3 |
| R16 = −6.447 | D16 = 0.44 | | |
| R17 = 9.216 | D17 = 0.16 | N9 = 1.846659 | v9 = 23.8 |
| R18 = 5.554 | D18 = 0.64 | N10 = 1.677900 | v10 = 55.3 |
| *R19 = −7.524 | D19 = 0.35 | | |
| R20 = −61.514 | D20 = 0.16 | N11 = 1.603112 | v11 = 60.7 |
| R21 = 3.578 | D21 = 0.47 | N12 = 1.603420 | v12 = 38.0 |
| R22 = −329.776 | D22 = Variable | | |
| *R23 = 4.655 | D23 = 0.64 | N13 = 1.583126 | v13 = 59.4 |
| R24 = −12.477 | D24 = 0.04 | | |
| R25 = 5.495 | D25 = 0.19 | N14 = 1.846660 | v14 = 23.8 |
| R26 = 2.569 | D26 = 1.04 | N15 = 1.487490 | v15 = 70.2 |
| R27 = −7.822 | D27 = 0.47 | | |
| R28 = ∞ | D28 = 0.33 | N16 = 1.516330 | v16 = 64.2 |
| R29 = ∞ | D29 = 0.33 | N17 = 1.552320 | v17 = 63.4 |
| R30 = ∞ | D30 = 0.18 | N18 = 1.556710 | v18 = 58.6 |
| R31 = ∞ | D31 = 3.29 | N19 = 1.589130 | v19 = 61.2 |
| R32 = ∞ | | | |

*Aspheric Surface

| Variable | Focal Length | | |
|---|---|---|---|
| Separation | 1.00 | 5.36 | 11.79 |
| D 5 | 0.17 | 3.71 | 4.70 |
| D13 | 4.88 | 1.35 | 0.35 |
| D22 | 1.98 | 1.14 | 1.89 |

Aspheric Coefficients:

| R15: | K = 4.96648e − 01 | B = 5.80929e − 04 | C = 6.64646e − 05 |
| | D = 0.00000e + 00 | E = 0.00000e + 00 | |
| R19: | K = 1.40724e + 01 | B = 5.49610e − 03 | C = 3.08330e − 04 |
| | D = 3.36288e − 04 | E = 0.00000e + 00 | |
| R23: | K = −4.76698e − 01 | B = −2.61764e − 03 | C = 1.32790e − 04 |
| | D = −4.95738e − 06 | E = 0.00000e + 00 | |

NUMERICAL EXAMPLE 9

| f = 1~11.79 | Fno = 1.65~2.85 | 2ω = 59.9°~5.6° | |
|---|---|---|---|
| R1 = 9.974 | D1 = 0.33 | N1 = 1.846660 | v1 = 23.8 |
| R2 = 5.521 | D2 = 1.32 | N2 = 1.603112 | v2 = 60.6 |
| R3 = −369.252 | D3 = 0.04 | | |
| R4 = 5.752 | D4 = 0.78 | N3 = 1.696797 | v3 = 55.5 |
| R5 = 20.226 | D5 = Variable | | |
| R6 = 8.400 | D6 = 0.19 | N4 = 1.882997 | v4 = 40.8 |
| R7 = 1.587 | D7 = 0.74 | | |
| R8 = −3.274 | D8 = 0.14 | N5 = 1.834807 | v5 = 42.7 |
| R9 = −37.214 | D9 = 0.11 | | |
| R10 = 2.691 | D10 = 0.58 | N6 = 1.846660 | v6 = 23.8 |
| R11 = −5.145 | D11 = 0.05 | | |
| R12 = −3.416 | D12 = 0.14 | N7 = 1.772499 | v7 = 49.6 |
| R13 = 3.822 | D13 = Variable | | |
| R14 = Stop | D14 = 0.71 | | |
| *R15 = −2.929 | D15 = 0.19 | N8 = 1.677900 | v8 = 55.3 |
| R16 = 17.608 | D16 = 0.49 | N9 = 1.698947 | v9 = 30.1 |
| R17 = −6.475 | D17 = Variable | | |
| R18 = 9.699 | D18 = 0.16 | N10 = 1.846660 | v10 = 23.8 |
| R19 = 6.493 | D19 = 0.71 | N11 = 1.589130 | v11 = 61.2 |
| *R20 = −5.919 | D20 = Variable | | |
| *R21 = 4.974 | D21 = 0.64 | N12 = 1.583126 | v12 = 59.4 |
| R22 = −13.664 | D22 = 0.04 | | |
| R23 = 5.735 | D23 = 0.19 | N13 = 1.846660 | v13 = 23.8 |
| R24 = 2.719 | D24 = 1.04 | N14 = 1.487490 | v14 = 70.2 |
| R25 = −7.127 | D25 = 0.47 | | |
| R26 = ∞ | D26 = 0.33 | N15 = 1.516330 | v15 = 64.2 |
| R27 = ∞ | D27 = 0.33 | N16 = 1.552320 | v16 = 63.4 |
| R28 = ∞ | D28 = 0.18 | N17 = 1.556710 | v17 = 58.6 |
| R29 = ∞ | D29 = 3.29 | N18 = 1.589130 | v18 = 61.2 |
| R30 = ∞ | | | |

*Aspheric Surface

| Variable | Focal Length | | |
|---|---|---|---|
| Separation | 1.00 | 5.31 | 11.79 |
| D 5 | 0.17 | 3.63 | 4.60 |
| D13 | 4.78 | 1.33 | 0.35 |
| D17 | 0.24 | 0.24 | 0.24 |
| D20 | 2.35 | 1.60 | 2.36 |

Aspheric Coefficients:

R15: K = 3.31301e − 01  B = −5.15009e − 04  C = 9.55288e − 05
     D = 0.00000e + 00  E = 0.00000e + 00
R20: K = 5.35769e + 00  B = 4.25451e − 03  C = 3.96870e − 04
     D = 1.19474e − 04  E = 0.00000e + 00
R21: K = −5.05051e − 01  B = −2.57290e − 03  C = 1.42977e − 04
     D = −7.66155e − 06  E = 0.00000e + 00

TABLE 3

| | | Numerical Example | | |
|---|---|---|---|---|
| | Condition | 7 | 8 | 9 |
| (8) | f3/fW | 11.59 | 19.07 | 17.95 |
| (9) | |f32/f3| | 0.63 | 0.35 | 0.39 |
| (10) | bfw/fW | 4.04 | 4.12 | 4.13 |
| (11) | |f2/√fW·fT| | 0.42 | 0.41 | 0.41 |

It will be appreciated from the foregoing that, according to the present embodiment, the variable magnification optical system is provided with a lens sub-unit of relatively small size and light weight as arranged to move in a direction perpendicular to the optical axis to compensate for image shaking as the variable magnification optical system vibrates (or tilts from the line of sight). This produces advantages of improving the compact form of the entire optical system, simplifying the structure of the operating mechanism, and reducing the load on the driving means. Nonetheless, the produced amount of decentering aberrations by moving that lens sub-unit is suppressed to a minimum. It is, therefore, made possible to achieve a variable magnification optical system having the image stabilizing function that is not only corrected well for the decentering aberrations but also has its image stabilizing lens sub-unit made to have a higher sensitivity, thereby further improving the compact form of the entire optical system.

We claim:

1. A variable magnification optical system having an image stabilizing function, comprising, in order from an object side, a fixed first lens unit of positive refractive power, a second lens unit of negative refractive power, a third lens unit of positive refractive power and a fourth lens unit of positive refractive power, said second lens unit and said fourth lens unit being moved along an optical axis to effect variation of magnification, wherein said third lens unit comprises a first lens sub-unit of negative refractive power and a second lens sub-unit of positive refractive power, and said second lens sub-unit is made to move in a direction perpendicular to the optical axis to stabilize an image, said variable magnification optical system satisfying the following conditions:

$$8 < f3/fw < 25$$

$$0.3 < |f32/f3| < 0.75$$

where f3 is a focal length of said third lens unit, fw is a focal length in a wide-angle end of the entire optical system, and f32 is a focal length of said second lens sub-unit.

2. A variable magnification optical system having an image stabilizing function according to claim 1, wherein said third lens unit has said first lens sub-unit and said second lens sub-unit disposed in order from the object side.

3. A variable magnification optical system having an image stabilizing function according to claim 1, wherein said third lens unit comprises, in order from the object side, said first lens sub-unit of negative refractive power, said second lens sub-unit of positive refractive power and a third lens sub-unit.

4. A variable magnification optical system having an image stabilizing function, comprising, in order from an object side, a first lens unit of positive refractive power, a second lens unit of negative refractive power, a third lens unit of positive refractive power and a fourth lens unit of positive refractive power, said second lens unit and said fourth lens unit being moved along an optical axis to effect variation of magnification, wherein said third lens unit comprises a first lens subunit of negative refractive power and a second lens subunit of positive refractive power, and said second lens sub-unit is made to move in a direction perpendicular to the optical axis to stabilize an image, said variable magnification optical system satisfying the following condition:

$$3 < bfW/fW < 6$$

where fW is a focal length in a wide-angle end of the entire optical system, and bfW is a back focal distance in the wide-angle end from the last lens surface of the optical system to an image plane as measured with an optical member of no refractive power removed.

5. A variable magnification optical system having an image stabilizing function according to claim 4, further satisfying the following conditions:

$8 < f3/fW < 25$ $0.3 < |f32/f3| < 0.75$ where f3 is a focal length of said third lens unit, and f32 is a focal length of said second lens sub-unit.

6. A variable magnification optical system having an image stabilizing function, comprising, in order from an object side, a fixed first lens unit of positive refractive power, a second lens unit of negative refractive power, a third lens unit of positive refractive power and a fourth lens unit of positive refractive power, said second lens unit and said fourth lens unit being moved along an optical axis to effect variation of magnification, wherein said third lens unit comprises a first lens sub-unit of negative refractive power, a second lens sub-unit having at least one negative lens and whose overall refractive power is positive, and a third lens sub-unit including one positive lens, and said second lens sub-unit is made to move in a direction perpendicular to the optical axis to stabilize an image.

7. A variable magnification optical system having an image stabilizing function according to claim 6, satisfying the following conditions:

$8 < f3/fW < 25$ $0.3 < |f32/f3| < 0.75$ where f3 is a focal length of said third lens unit, fW is a focal length in a wide-angle end of the entire optical system, and f32 is a focal length of said second lens sub-unit.

8. A variable magnification optical system having an image stabilizing function according to one of claims 1 to 7, satisfying the following condition:

$0.3 < |f2/\sqrt{fW \cdot fT}| < 0.5$ where f2 is a focal length of said second lens unit, and fW and fT are focal lengths in a wide-angle end and a telephoto end of the entire optical system, respectively.

9. An optical apparatus comprising:
a variable magnification optical system according to claim 8; and
an image pickup element arranged to receive an image formed by said variable magnification optical system.

10. A zoom lens system comprising, in order from an object side to an image side:
a first lens unit of positive optical power;
a second lens unit of negative optical power, said second lens unit moving along an optical axis for zooming;
a third lens unit of positive optical power, said third lens unit comprising a lens sub-unit of positive optical power and a lens sub-unit of negative optical power; and
a fourth lens unit of positive optical power, said fourth lens unit moving along the optical axis for zooming,
wherein said lens sub-unit of positive optical power moves in such a way as to have a component perpendicular to the optical axis, and
wherein said zoom lens system satisfies the following conditions:

$8 < f3/fw < 25$ $0.3 < |f32/f3| < 0.75$ wherein f3 is a focal length of said third lens unit, fw is a focal length in a wide-angle end of said zoom lens system, and f32 is a focal length of said lens sub-unit of positive optical power.

11. A zoom lens system according to claim 10, wherein said third lens unit comprises, in order from the object side to the image side, said lens sub-unit of negative optical power and said lens sub-unit of positive optical power.

12. A zoom lens system according to claim 10, wherein said zoom lens system forms an image on an image sensor.

13. A camera comprising:
a zoom lens system according to claim 10; and
an image sensor for receiving an image formed by said zoom lens system.

14. A zoom lens system comprising, in order from an object side to an image side:
a first lens unit of positive optical power;
a second lens unit of negative optical power, said second lens unit moving along an optical axis for zooming;
a third lens unit of positive optical power, said third lens unit comprising a lens sub-unit of positive optical power and a lens sub-unit of negative optical power; and
a fourth lens unit of positive optical power, said fourth lens unit moving along the optical axis for zooming,
wherein said lens sub-unit of positive optical power moves in such a way as to have a component perpendicular to the optical axis, and
wherein said zoom lens system satisfies the following condition:

$3 < bfw/fw < 6$ where fw is a focal length in a wide-angle end of said zoom lens system, and bfw is a back focal distance in the wide angle end.

15. A zoom lens system according to claim 14, wherein said third lens unit comprises, in order from the object side to the image side, said lens sub-unit of negative optical power and said lens sub-unit of positive optical power.

16. A zoom lens system according to claim 15, wherein said zoom lens system forms an image on an image sensor.

17. A camera comprising:
a zoom lens system according to claim 15; and
an image sensor for receiving an image formed by said zoom lens system.

* * * * *

UNITED STATES PATENT AND TRADEMARK OFFICE
CERTIFICATE OF CORRECTION

PATENT NO. : 6,606,194 B2  Page 1 of 1
DATED : August 12, 2003
INVENTOR(S) : Hiroyuki Hamano et al.

It is certified that error appears in the above-identified patent and that said Letters Patent is hereby corrected as shown below:

Column 3,
Line 18, "to the" should read -- of --.

Column 8,
Line 28, "examples" should read -- example --.
Line 60, "(i-2)" should begin a new paragraph.

Column 9,
Line 42, "β4" should read -- β4t --.

Column 14,
Line 65, "(ii-1) should begin a new paragraph.

Column 15,
Line 14, "(ii-2)" should begin a new paragraph.
Line 39, "(ii-3)" should begin a new paragraph.

Column 21,
Line 32, "shorting" should read -- shortening --.

Column 26,
Lines 52 and 53, "subunit" should read -- sub-unit --.

Column 27,
Line 6, "6. A. A" should read -- 6. A --.

Signed and Sealed this

Thirteenth Day of April, 2004

JON W. DUDAS
*Acting Director of the United States Patent and Trademark Office*